United States Patent
Kurahashi et al.

(10) Patent No.: US 10,944,925 B2
(45) Date of Patent: Mar. 9, 2021

(54) GLOBAL SHUTTERING, FIRST ROLLING READOUT AND SECOND ROLLING READOUT EMPLOYED WITH AN IMAGING APPARATUS, IMAGING METHOD, AND IMAGING PROGRAM

(71) Applicant: FUJIFILM Corporation, Tokyo (JP)

(72) Inventors: Hidekazu Kurahashi, Saitama (JP); Fuminori Irie, Saitama (JP); Yoshinori Furuta, Saitama (JP); Hitoshi Sakurabu, Saitama (JP); Tomonori Masuda, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/580,840

(22) Filed: Sep. 24, 2019

(65) Prior Publication Data

US 2020/0021756 A1 Jan. 16, 2020

Related U.S. Application Data

(63) Continuation of application No. PCT/JP2018/008398, filed on Mar. 5, 2018.

(30) Foreign Application Priority Data

Mar. 24, 2017 (JP) .............................. JP2017-059678

(51) Int. Cl.
*H04N 5/335* (2011.01)
*H04N 5/353* (2011.01)
*H04N 5/374* (2011.01)

(52) U.S. Cl.
CPC ......... *H04N 5/3532* (2013.01); *H04N 5/3741* (2013.01); *H04N 5/3742* (2013.01)

(58) Field of Classification Search
CPC .......................... H04N 5/3741; H04N 5/3532
See application file for complete search history.

(56) References Cited

U.S. PATENT DOCUMENTS

| 8,994,861 B2 * | 3/2015 | Kobayashi ............. | H04N 5/335 |
| | | | 348/294 |
| 10,623,673 B2 * | 4/2020 | Kawai .................... | H04N 5/378 |
| 2012/0182455 A1 * | 7/2012 | Gomi ................... | H04N 5/3532 |
| | | | 348/311 |

FOREIGN PATENT DOCUMENTS

| JP | 2012-004819 A | 1/2012 |
| JP | 2012-10074 A | 1/2012 |
| JP | 2012-129817 A | 7/2012 |

OTHER PUBLICATIONS

International Preliminary Report on Patentability and English translation of the Written Opinion of the International Searching Authority (Forms PCT/IB/326, PCT/IB/373, and PCT/ISA/237) for International Application No. PCT/JP2018/008398, dated Oct. 3, 2019.

(Continued)

*Primary Examiner* — Gary C Vieaux
(74) *Attorney, Agent, or Firm* — Birch, Stewart, Kolasch & Birch, LLP

(57) ABSTRACT

An imaging apparatus includes: an imager that has a plurality of pixels as defined herein, that includes a plurality of pixel rows including the plurality of pixels arranged in one direction, and that discharges charges of the photoelectric conversion element and the charge holder to a charge discharge region of the readout circuit as defined herein; and an imaging controller that performs a global reset drive, a global shutter drive, a first rolling readout drive, a rolling shutter drive and a second rolling readout drive as defined herein, and the imaging controller performs a first imaging control as defined herein.

15 Claims, 15 Drawing Sheets

(56) References Cited

OTHER PUBLICATIONS

International Search Report (Form PCT/ISA/210) for International Application No. PCT/JP2018/008398, dated May 15, 2018, with English translation.

* cited by examiner

GLOBAL SHUTTERING, FIRST ROLLING READOUT AND SECOND ROLLING READOUT EMPLOYED WITH AN IMAGING APPARATUS, IMAGING METHOD, AND IMAGING PROGRAM

CROSS REFERENCE TO RELATED APPLICATION

This is a continuation of International Application No. PCT/JP2018/008398 filed on Mar. 5, 2018, and claims priority from Japanese Patent Application No. 2017-059678 filed on Mar. 24, 2017, the entire disclosures of which are incorporated herein by reference.

BACKGROUND OF THE INVENTION

1. Field of the Invention

The present invention relates to an imaging apparatus, an imaging method, and a computer readable medium storing an imaging program.

2. Description of the Related Art

In recent years, with an increase in resolution of imagers such as charge coupled device (CCD) image sensors or complementary metal oxide semiconductor (CMOS) image sensors, there has been a rapid increase in the demand for electronic devices having imaging functions of electronic endoscopes, digital still cameras, digital video cameras, mobile phones with cameras, or the like. Note that an electronic device having an imaging function as described above is referred to as an imaging apparatus.

Examples of a MOS type imager includes one which includes a photoelectric conversion element, a charge holding section that holds a charge generated and accumulated in the photoelectric conversion element, and a readout circuit that reads out, to a signal line, a voltage signal corresponding to the charge held in the charge holding section, and in which pixels are two-dimensionally disposed.

Such an imager can perform a global shutter type drive and rolling shutter type drive.

In the global shutter drive type, the photoelectric conversion elements of all the pixels are simultaneously reset to start exposure simultaneously in all the pixels, then charges accumulated in the photoelectric conversion elements of each pixel are transferred to the charge holding section of each pixel to simultaneously end the exposure in all the pixels, and then the charges accumulated in the charge holding section are sequentially converted to pixel signals for each pixel row and are read out to a signal line.

In the rolling shutter type drive, the photoelectric conversion elements of the pixel row are reset to start the exposure of the pixel row, and then the charges accumulated in the photoelectric conversion elements of the pixel row are transferred to the charge holding section to end the exposure to sequentially perform a drive for reading out, to the signal line, the pixel signal corresponding to the charge held in the charge holding section, while changing the pixel rows.

JP2012-129817A discloses an imaging apparatus which drives the imager by a global shutter type at the time of imaging for a still image storage, and drives the imager by the rolling shutter type at the time of imaging for a live view image display.

JP2012-129817A discloses a start of the imaging for the live view image display during a readout period of the pixel signal from the charge holding section at the time of imaging for the still image storage.

SUMMARY OF THE INVENTION

In an imaging apparatus that displays a live view image, the live view image is updated at a regular interval. Therefore, for synchronizing an end timing of imaging for a live view image display and an update timing of the live view image display, a drive condition of the imager is determined.

On the other hand, the number of the pixel signals read out from the charge holding section is larger in imaging for a still image storage than in the imaging for the live view image display. Therefore, a time required for reading out the pixel signal from the charge holding section becomes longer in the imaging for the still image storage than in the imaging for the live view image display.

Due to a difference in a readout time, normally, the imaging for the live view image display is resumed after the imaging for the still image storage ends (the readout of the pixel signals from all the charge holding sections is completed).

However, in a method of resuming the imaging for the live view image display after the imaging for the still image storage ends, the time when the live view image cannot be updated may become long. In this case, for a user who picks up an image while looking at a display device, a possibility of losing a subject becomes high.

In an imaging apparatus disclosed in JP2012-129817A, the readout time of the pixel signal from the charge holding section is the same for the global shutter type drive and the drive of the rolling shutter drive type, and a case that the readout time of the pixel signal in the global shutter type drive becomes relatively long is not taken into account.

The present invention has been made in view of the above described situations, and an object of the present invention is to provide an imaging apparatus, an imaging method, and a computer readable medium storing an imaging program capable of speeding up an update of a live view image display after an imaging for a storage to reduce a risk of losing sight of the subject.

An imaging apparatus of the present invention is an imaging apparatus comprising:
  an imager
    that has a plurality of pixels each including a photoelectric conversion element, and a charge holder holding a charge transferred from the photoelectric conversion element such that a signal corresponding to the charge is read out by a readout circuit,
    that comprises a plurality of pixel rows including the plurality of pixels arranged in one direction, and
    that discharges charges of the photoelectric conversion element and the charge holder to a charge discharge region of the readout circuit such that a reset of each of the photoelectric conversion element and the charge holder is performed; and
  an imaging controller that performs
    a global reset drive of simultaneously resetting the photoelectric conversion element of each of the plurality of pixels to start exposure of the plurality of pixels,
    a global shutter drive of simultaneously transferring, to the charge holder, the charges accumulated in the photoelectric conversion element of each of the plurality of pixels by the exposure to end the exposure, a first rolling readout drive of sequentially reading out, for each of the pixel rows, the signal corresponding to the charge held in the charge holder by the global shutter drive, a rolling shutter drive of sequentially performing processing of transferring, to the charge holder, the charge accumulated in the photoelectric conversion element of the pixel row for which the exposure has been started to end the exposure of the pixel row, while changing the pixel rows, and a second rolling readout drive of sequentially reading out the signal corresponding to the charge held in the charge holder of the pixel row by the rolling shutter drive, while changing the pixel rows, wherein the imaging controller performs a first imaging control in which after the global reset drive, the global shutter drive, and the first rolling readout drive are sequentially performed, the rolling shutter drive is performed to sequentially end, for each of the pixel rows, the exposure of the pixels started by the global shutter drive, and the second rolling readout drive is performed to read out the signal corresponding to the charge held in the charge holder of the pixel row for which the exposure has been ended.

An imaging method of the present invention is an imaging method using an imager that has a plurality of pixels each including a photoelectric conversion element, and a charge holder holding a charge transferred from the photoelectric conversion element such that a signal corresponding to the charge is read out by a readout circuit, that comprises a plurality of pixel rows including the plurality of pixels arranged in one direction, and that discharges charges of the photoelectric conversion element and the charge holder to a charge discharge region of the readout circuit such that a reset of each of the photoelectric conversion element and the charge holder is performed, the imaging method comprising:

an imaging control step of performing a global reset drive of simultaneously resetting the photoelectric conversion element of each of the plurality of pixels to start exposure of the plurality of pixels, a global shutter drive of simultaneously transferring, to the charge holder, the charges accumulated in the photoelectric conversion element of each of the plurality of pixels by the exposure to end the exposure, a first rolling readout drive of sequentially reading out, for each of the pixel rows, the signal corresponding to the charge held in the charge holder by the global shutter drive, a rolling shutter drive of sequentially performing processing of transferring, to the charge holder, the charge accumulated in the photoelectric conversion element of the pixel row for which the exposure has been started to end the exposure of the pixel row, while changing the pixel rows, and a second rolling readout drive of sequentially reading out the signal corresponding to the charge held in the charge holder of the pixel row by the rolling shutter drive, while changing the pixel rows, wherein in the imaging control step, a first imaging control is performed, in which after the global reset drive, the global shutter drive, and the first rolling readout drive are sequentially performed, the rolling shutter drive is performed to sequentially end, for each of the pixel rows, the exposure of the pixels started by the global shutter drive, and the second rolling readout drive is performed to read out the signal corresponding to the charge held in the charge holder of the pixel row for which the exposure has been ended.

An imaging program of the present invention is an imaging program causing a computer to execute an imaging method using an imager that has a plurality of pixels each including a photoelectric conversion element, and a charge holder holding a charge transferred from the photoelectric conversion element such that a signal corresponding to the charge is read out by a readout circuit, that comprises a plurality of pixel rows including the plurality of pixels arranged in one direction, and that discharges charges of the photoelectric conversion element and the charge holder to a charge discharge region of the readout circuit such that a reset of each of the photoelectric conversion element and the charge holder is performed, the imaging method comprising:

an imaging control step of performing a global reset drive of simultaneously resetting the photoelectric conversion element of each of the plurality of pixels to start exposure of the plurality of pixels, a global shutter drive of simultaneously transferring, to the charge holder, the charges accumulated in the photoelectric conversion element of each of the plurality of pixels by the exposure to end the exposure, a first rolling readout drive of sequentially reading out, for each of the pixel rows, the signal corresponding to the charge held in the charge holder by the global shutter drive, a rolling shutter drive of sequentially performing processing of transferring, to the charge holder, the charge accumulated in the photoelectric conversion element of the pixel row for which the exposure has been started to end the exposure of the pixel row, while changing the pixel rows, and a second rolling readout drive of sequentially reading out the signal corresponding to the charge held in the charge holder of the pixel row by the rolling shutter drive, while changing the pixel rows, wherein in the imaging control step, a first imaging control is performed, in which after the global reset drive, the global shutter drive, and the first rolling readout drive are sequentially performed, the rolling shutter drive is performed to sequentially end, for each of the pixel rows, the exposure of the pixels started by the global shutter drive, and the second rolling readout drive is performed to read out the signal corresponding to the charge held in the charge holder of the pixel row for which the exposure has been ended.

According to the present invention, it is possible to provide an imaging apparatus, an imaging method, and an imaging program capable of speeding up an update of a live view image display after an imaging for a storage to reduce a risk of losing sight of the subject.

DESCRIPTION OF THE PREFERRED EMBODIMENTS

Hereinafter, embodiments of the present invention will be described with reference to the drawings.

Figure 1:
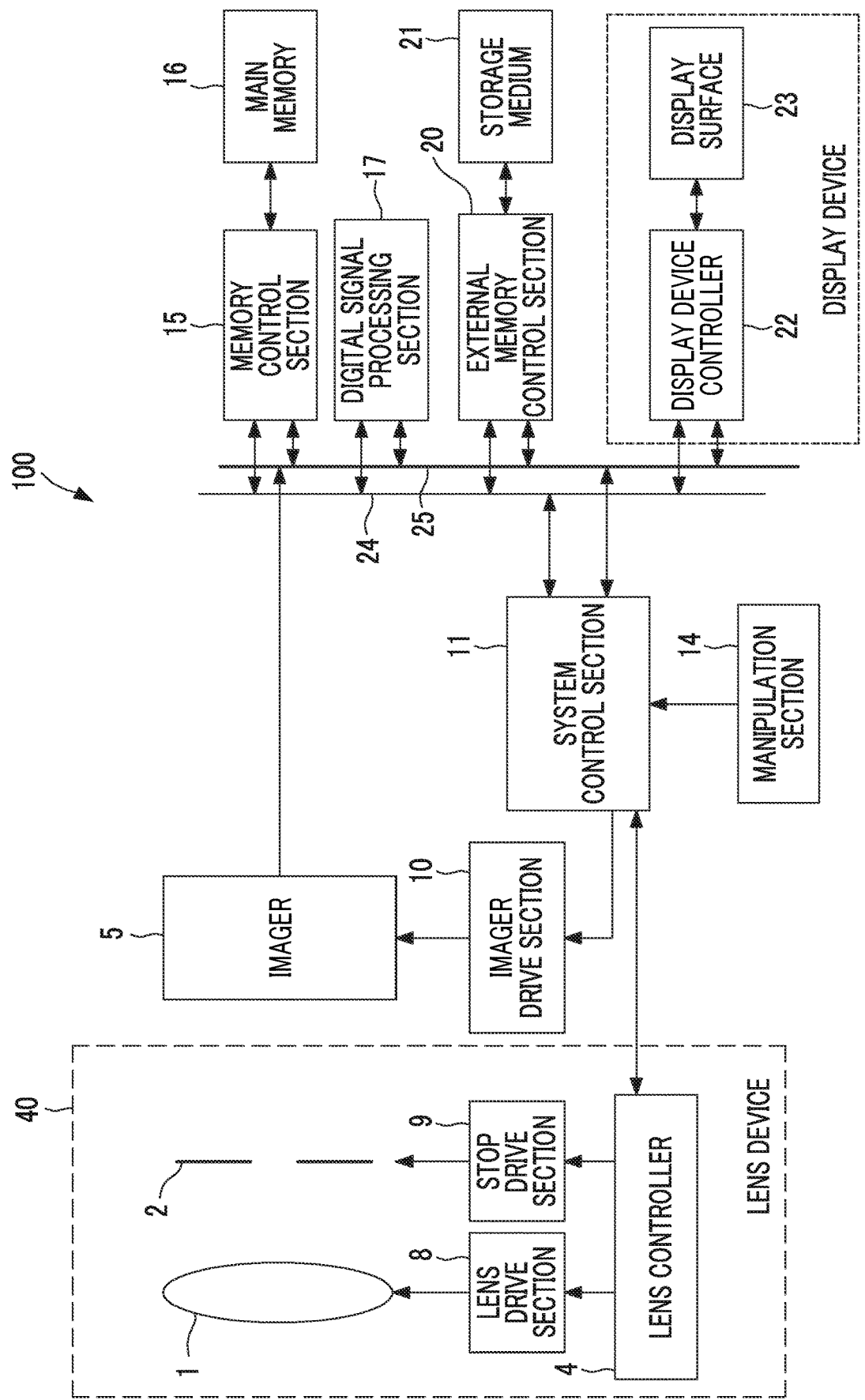
FIG. 1 is a diagram showing a schematic configuration of a digital camera 100 which is an embodiment of an imaging apparatus of the present invention.

FIG. 1 is a diagram showing a schematic configuration of a digital camera 100 which is an embodiment of an imaging apparatus of the present invention.

The digital camera 100 shown in FIG. 1 comprises a lens device 40 having an imaging lens 1, a stop 2, a lens control section 4, a lens drive section 8, and a stop drive section 9.

The lens device 40 may be attachable to and detachable from the digital camera 100 or may be integrated with the digital camera 100.

The imaging lens 1 and the stop 2 constitute an imaging optical system, and the imaging lens 1 includes a focus lens or a zoom lens movable in an optical axis direction, or the like.

The focus lens is a lens for adjusting a focus of the imaging optical system, and is composed of a single lens or a plurality of lenses. As the focus lens moves in the optical axis direction, a position of a principal point of the focus lens changes along the optical axis direction, and a focal position on a subject side changes.

As the focus lens, a liquid lens, capable of a focus adjustment by changing the position of the principal point in the optical axis direction by an electric control, may be used.

The lens control section 4 of the lens device 40 is configured to be capable of communicating with a system control section 11 of the digital camera 100 by wire or wireless.

The lens control section 4 controls the focus lens included in the imaging lens 1 via the lens drive section 8 in accordance with a command from the system control section 11 to change the position of the principal point of the focus lens (changes a focal length), or controls an aperture size of the stop 2 via the stop drive section 9. In the present specification, an F-Number of the stop 2 is a value indicating the aperture size of the stop 2, and the greater the F-Number, the smaller the aperture size.

The digital camera 100 further comprises a MOS type imager 5 that images the subject through the imaging optical system.

The imager 5 has an imaging surface in which a plurality of pixels is two-dimensionally disposed, and converts a subject image, formed on the imaging surface by the imaging optical system, to a pixel signal by the plurality of pixels and outputs the signal. Hereinafter, a set of pixel signals output from each pixel of the imager 5 is referred to as a picked up image signal.

The system control section 11, which collectively controls an entire electric control system of the digital camera 100, drives the imager 5 via an imager drive section 10, and output the subject image picked up through the imaging optical system of the lens device 40 as the picked up image signal.

A command signal from a user is input to the system control section 11 through a manipulation section 14.

The system control section 11 collectively controls the entire digital camera 100, and has a hardware structure that refers to various types of processors that execute programs including an imaging program to perform processing.

Various types of processors include a programmable logic device (PLD) that is a processor capable of changing a circuit configuration after manufacturing of a central processing unit (CPU), a field programmable gate array (FPGA), or the like as a general-purpose processor that performs various types of processing by executing programs, a dedicated electric circuit that is a processor having a circuit configuration designed exclusively for executing specific processing of an application specific integrated circuit (ASIC) or the like, and the like.

More specifically, a structure of the various types of processors is an electric circuit in which circuit elements such as semiconductor elements are combined.

The system control section 11 may be configured as one of various processors, or may be configured as a combination of two or more of the same or different types of processors (for example, a combination of a plurality of FPGAs or a combination of the CPU and the FPGA).

Further, the electric control system of the digital camera 100 comprises a main memory 16 including a random access memory (RAM), a memory control section 15 that controls a data storage in the main memory 16 and a data readout from the main memory 16, a digital signal processing section 17 that performs digital signal processing on the picked up image signal output from the imager 5 and generates picked up image data in accordance with various types of formats such as a JPEG (Joint Photographic Experts Group) format; an external memory control section 20 that controls a data storage in a storage medium 21 and a data readout from the storage medium 21, a display surface 23 including an organic electroluminescence (EL) panel, a liquid crystal panel, or the like, and a display device controller 22 that controls a display of the display surface 23. The display surface 23 and the display device controller 22 constitute a display device.

The storage medium 21 is a semiconductor memory such as a flash memory built in the digital camera 100 or a portable semiconductor memory attachable to and detachable from the digital camera 100.

The memory control section 15, the digital signal processing section 17, the external memory control section 20, and the display device controller 22 are mutually connected by a control bus 24 and a data bus 25, and are controlled by the command from the system control section 11.

The digital signal processing section 17 has a hardware structure referring to the above exemplified various types of processors that execute the program and perform the processing.

The display device controller 22 includes the above exemplified various types of processors that execute the program to perform the processing, and a display memory for holding the image data to be displayed.

Figure 2:
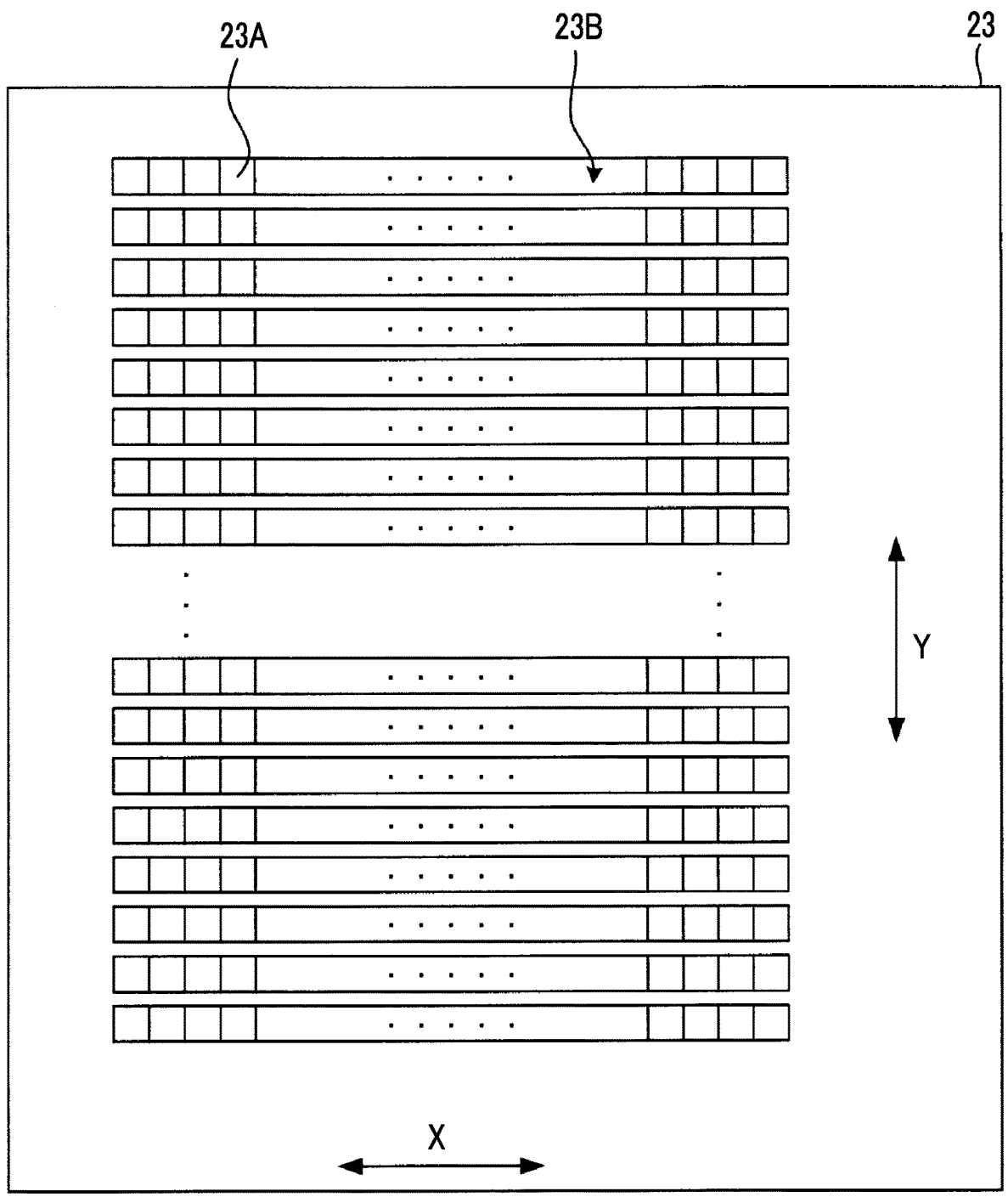
FIG. 2 is a schematic plan view showing a schematic configuration of a display surface 23 shown in FIG. 1.

FIG. 2 is a schematic plan view showing a schematic configuration of the display surface 23 shown in FIG. 1.

The display surface 23 is a surface in which a plurality of display pixel rows 23B including a plurality of display pixels 23A aligned in a row direction X that is one direction is arranged in a column direction Y that is an orthogonal direction orthogonal to the row direction X.

The display device controller 22 performs drawing update processing of sequentially updating a line image to be drawn on a display pixel row 23B, from the display pixel row 23B at an upper end (one end) of the display surface 23 in the column direction Y toward the display pixel row 23B at a lower end (the other end), so that a live view image including the same number of line images as the display pixel row 23B is displayed on the display surface 23.

Figure 3:
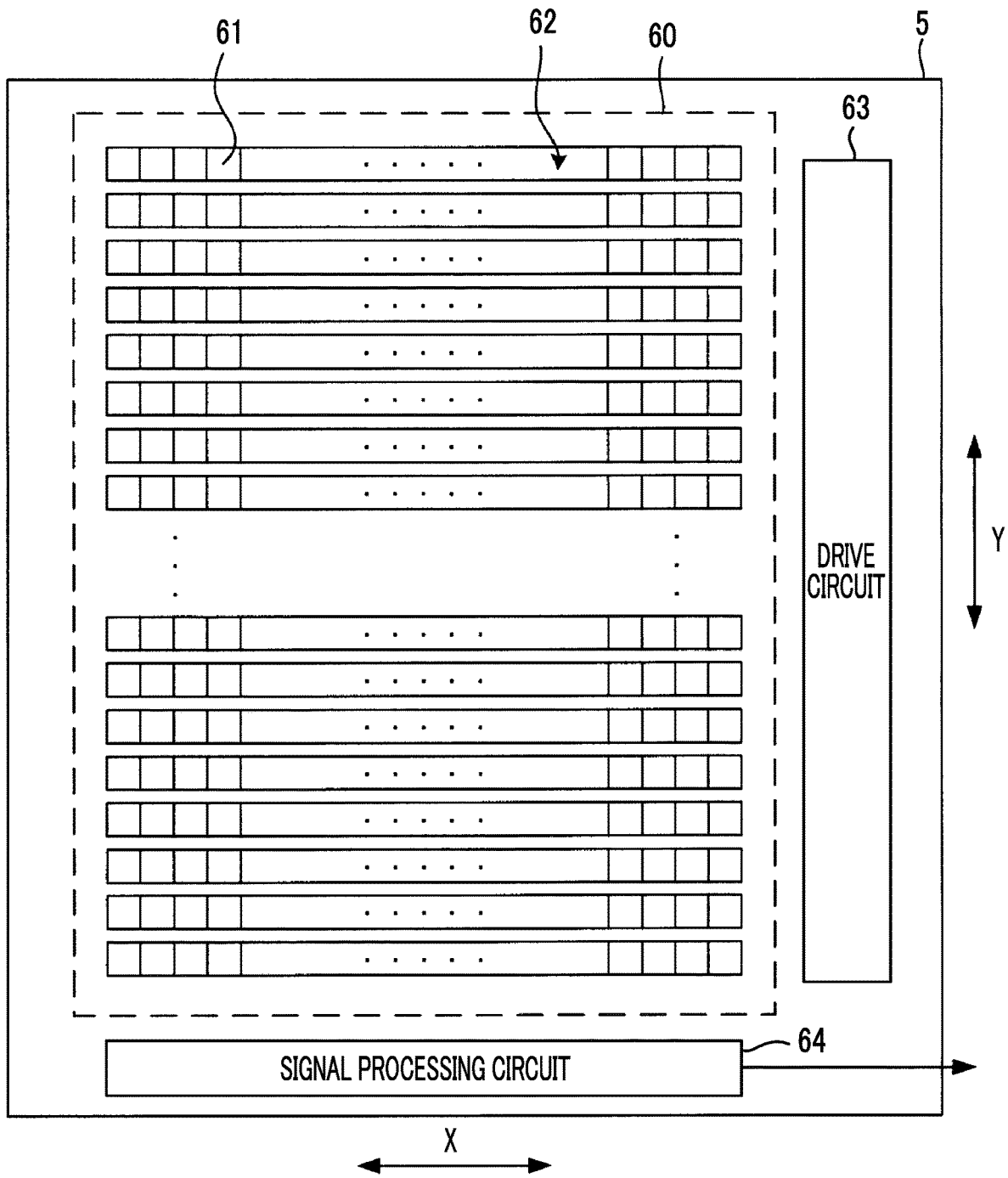
FIG. 3 is a schematic plan view showing a schematic configuration of an imager 5 shown in FIG. 1.
Figure 4:
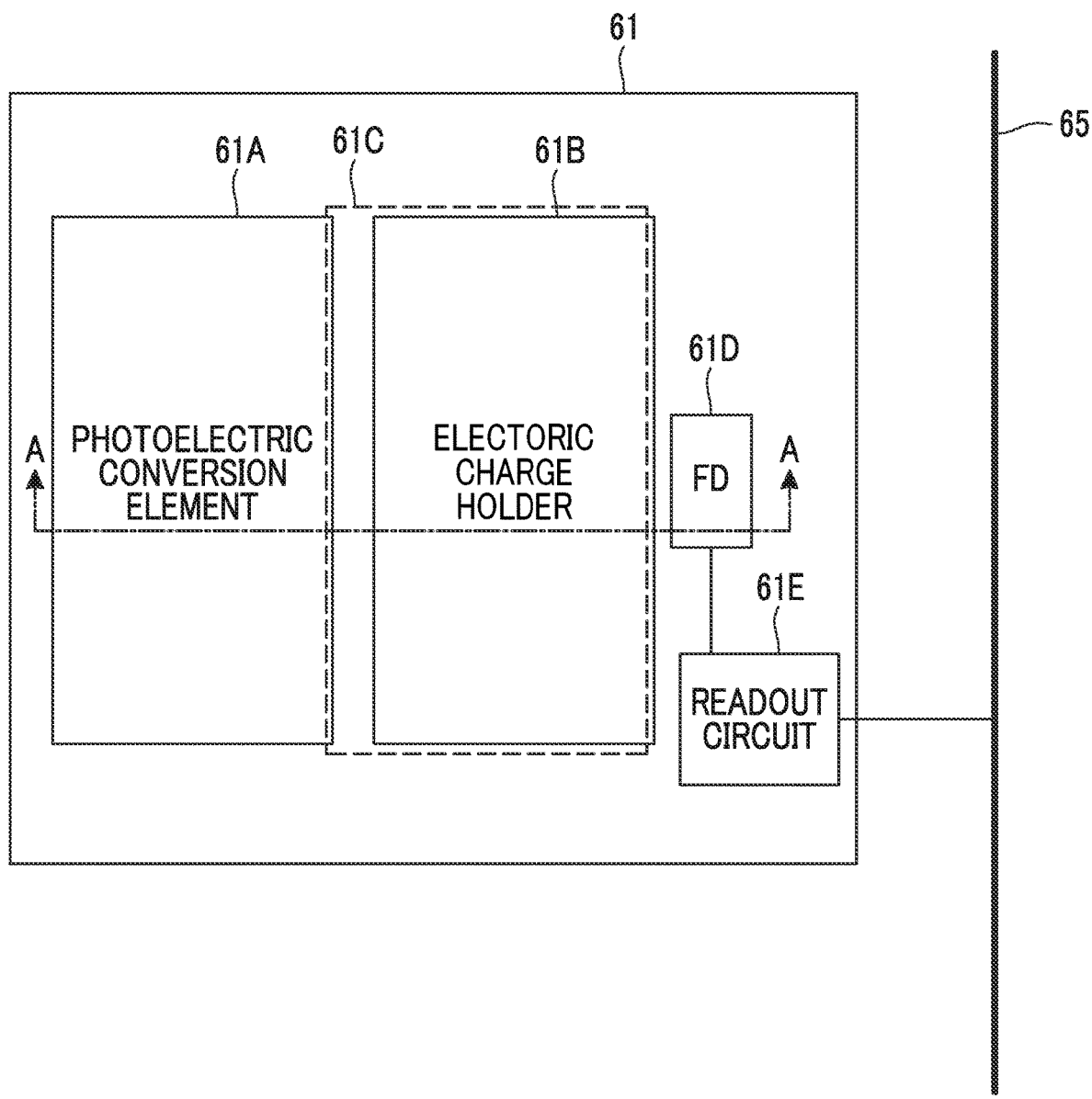
FIG. 4 is a schematic plan view showing a schematic configuration of a pixel 61 of the imager 5 shown in FIG. 3.
Figure 5:
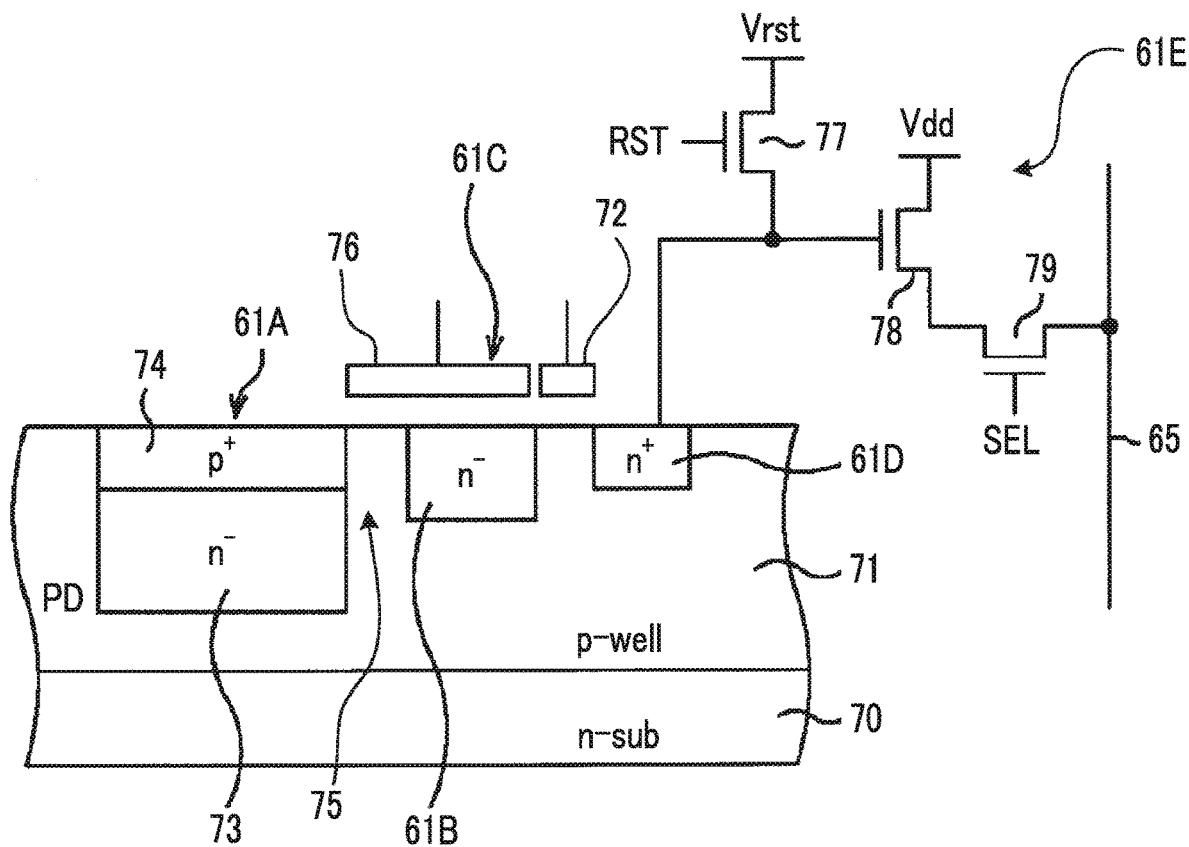
FIG. 5 is a schematic cross-sectional view taken along the line A-A of the pixel 61 of the imager 5 shown in FIG. 4.

FIG. 3 is a schematic plan view showing a schematic configuration of the imager 5 shown in FIG. 1. FIG. 4 is a schematic plan view showing a schematic configuration of a pixel 61 of the imager 5 shown in FIG. 3. FIG. 5 is a schematic cross-sectional view taken along the line A-A of the pixel 61 of the imager 5 shown in FIG. 4.

The imager 5 comprises an imaging surface 60 on which a plurality of pixel rows 62 including a plurality of pixels 61 arranged in the row direction X is arranged in the column direction Y orthogonal to the row direction X, a drive circuit 63 that drives the pixel 61 arranged on the imaging surface 60, and a signal processing circuit 64 that processes the pixel signal which is read out, to the signal line, from the each pixel 61 of the pixel row 62 arranged on the imaging surface 60.

Hereinafter, an end portion on an upper side of the imaging surface 60 in the column direction Y in FIG. 3 is referred to as the upper end, and a lower portion of a lower side of the imaging surface 60 in the column direction Y is referred to as the lower end. The upper end constitutes one end of the imaging surface 60, and the lower end constitutes the other end of the imaging surface 60.

As shown in FIG. 4, the pixel 61 comprises a photoelectric conversion element 61A, a charge holder 61B, a charge transfer section 61C, a floating diffusion 61D, and a readout circuit 61E formed on a semiconductor substrate.

The photoelectric conversion element 61A receives light passing through the imaging optical system of the lens device 40, and generates charges corresponding to an amount of received light and accumulates the charges. The photoelectric conversion element 61A includes a photodiode or the like.

The charge transfer section 61C transfers the charge accumulated in the photoelectric conversion element 61A to the charge holder 61B. The charge transfer section 61C includes an impurity region in the semiconductor substrate and an electrode formed above the impurity region.

A voltage applied to the electrode constituting the charge transfer section 61C is controlled by the drive circuit 63, and thus the charge is transferred from the photoelectric conversion element 61A to the charge holder 61B.

The charge holder 61B holds the charge transferred from the photoelectric conversion element 61A by the charge transfer section 61C. The charge holder 61B includes the impurity region in the semiconductor substrate.

The floating diffusion 61D is for converting the charge to a signal, and the charge held by the charge holder 61B is transferred.

The readout circuit 61E is a circuit that reads out, to a signal line 65, the signal corresponding to a potential of the floating diffusion 61D as the pixel signal. The readout circuit 61E is driven by the drive circuit 63.

As shown in FIG. 5, a P-well layer 71 is formed on a surface of the N-type substrate 70, and the photoelectric conversion element 61A is formed on a surface section of the P-well layer 71.

The photoelectric conversion element 61A includes an N-type impurity layer 73 and a P-type impurity layer 74 formed on the N-type impurity layer 73. The N-type substrate 70 and the P-well layer 71 constitute the semiconductor substrate.

On the surface section of the P-well layer 71, a charge holder 61B including an N-type impurity layer is formed to be slightly spaced from the photoelectric conversion element 61A.

A transfer electrode 76 is formed above a region 75 of the P-well layer 71 between the charge holder 61B and the photoelectric conversion element 61A via an oxide film (not shown).

The region 75 and the transfer electrode 76 constitute the charge transfer section 61C. In the example of FIG. 5, the transfer electrode 76 is formed above up to the charge holder 61B, but the transfer electrode 76 may be used as long as the transfer electrode 76 is formed above at least the region 75.

By controlling the potential of the transfer electrode 76 and forming a channel in the region 75, the charge accumulated in the photoelectric conversion element 61A can be transferred to the charge holder 61B. The potential of the transfer electrode 76 is controlled by the drive circuit 63.

The floating diffusion 61D including the N-type impurity layer is formed on the surface section of the P-well layer 71 to be slightly spaced from the charge holder 61B.

Above the P-well layer 71 between the charge holder 61B and the floating diffusion 61D, a readout electrode 72 is formed via the oxide film (not shown).

By controlling the potential of the readout electrode 72 to form the channel in the region between the charge holder 61B and the floating diffusion 61D, the charge held by the charge holder 61B can be transferred to the floating diffusion 61D. The potential of the readout electrode 72 is controlled by the drive circuit 63.

In the example shown in FIG. 5, the readout circuit 61E includes a reset transistor 77 for resetting the potential of the floating diffusion 61D, an output transistor 78 that converts the potential of the floating diffusion 61D to the pixel signal and outputs the pixel signal, and a selection transistor 79 for selectively reading out, to the signal line 65, the pixel signal output from the output transistor 78. The configuration of the readout circuit is not limited to the above description, which is an example.

Note that the readout circuit 61E may be shared by the plurality of pixels 61.

The drive circuit 63 shown in FIG. 3 drives the transfer electrode 76, the readout electrode 72, and the readout circuit 61E of each pixel 61 independently for each pixel row 62 to reset each photoelectric conversion element 61A included in the pixel row 62 (a discharge of the charge accumulated in the photoelectric conversion element 61A), and read out, to the signal line 65, the pixel signal corresponding to the charge accumulated in each photoelectric conversion element 61A, or the like.

In addition, the drive circuit 63 simultaneously drives the charge transfer sections 61C of all the pixels 61 to simultaneously transfer the charges from the photoelectric conversion element 61A of each pixel 61 to the charge holder 61B. The drive circuit 63 is controlled by the imager drive section 10.

The photoelectric conversion element 61A is reset by resetting the floating diffusion 61D by the reset transistor 77 in a state in which the charge transfer section 61C can transfer the charge and the channel is formed in the semiconductor substrate below the readout electrode 72. The drain region of the reset transistor 77 constitutes a charge discharge region.

Therefore, when the readout of the pixel signal corresponding to the charge held by the charge holder 61B is in a state of being completed, the photoelectric conversion element 61A that transfers the charge to the charge holder 61B can be reset.

The signal processing circuit 64 shown in FIG. 3 performs a correlative double sampling processing on the pixel signal read out from each pixel 61 of the pixel row 62 to the signal line 65, and converts the pixel signal after the correlative double sampling processing to the digital signal so as to output the pixel signal to the data bus 25. The signal processing circuit 64 is controlled by the imager drive section 10.

The total number M of the pixel rows 62 formed on the imaging surface 60 of the imager 5 is larger than the total number m of display pixel rows 23B formed on the display surface 23.

In the digital camera 100, of M pixel rows 62 formed on the imaging surface 60, m pixel rows 62 aligned at a regular interval toward the column direction Y are set as a display target pixel row. Hereinafter, the pixel row 62 set as the display target pixel row is also referred to as the display target pixel row 62.

An i-th (i is 1 to m) display target pixel row 62 counted from the upper end of the imaging surface 60 is managed in association with the i-th display pixel row 23B counted from the upper end of the display surface 23.

Figure 6:
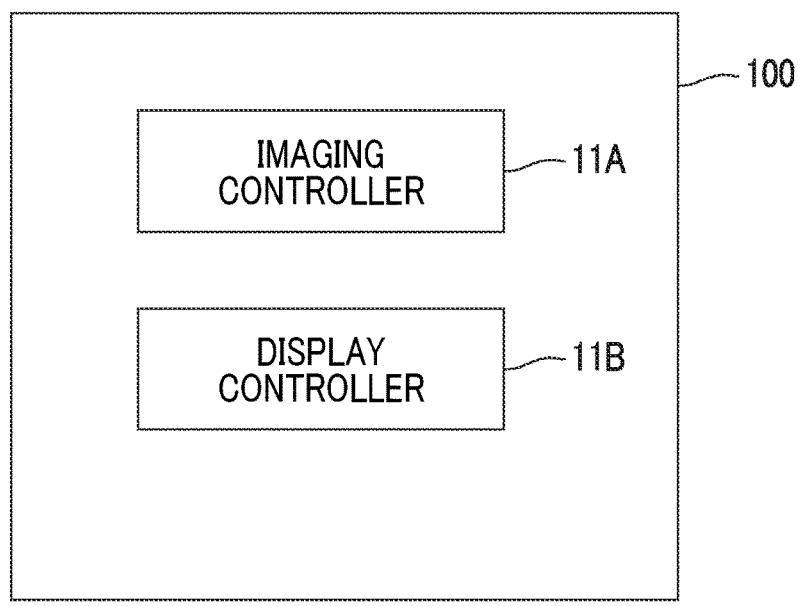
FIG. 6 is a functional block diagram of a digital camera 100 shown in FIG. 1.

FIG. 6 is a functional block diagram of the digital camera 100 shown in FIG. 1.

The digital camera 100 comprises an imaging controller 11A and a display controller 11B as the functional block.

The system control section 11 functions as the imaging controller 11A and the display controller 11B by executing the program including the imaging program.

The imaging controller 11A controls the imager drive section 10 to drive the imager 5 respectively by a global reset drive, a global shutter drive, a rolling reset drive, a rolling shutter drive, a first rolling readout drive, and a second rolling readout drive.

The global reset drive is a drive that simultaneously resets the photoelectric conversion element 61A of each pixel 61 formed on the imaging surface 60 of the imager 5, and simultaneously starts exposure of each pixel 61.

The global shutter drive is a drive that transfers, to the charge holder 61B, the charge accumulated in the photoelectric conversion element 61A of each pixel 61 by the exposure started in each pixel 61 by the global reset drive, and simultaneously ends the exposure in each pixel 61.

The rolling reset drive is a drive that sequentially performs processing of resetting the photoelectric conversion element 61A of the display target pixel row 62 and of starting exposure of the photoelectric conversion element 61A, changing the display target pixel row 62.

The rolling shutter drive is a drive that sequentially performs processing of transferring the charge from the photoelectric conversion element 61A of the exposed display target pixel row 62 to the charge holder 61B of the display target pixel row 62 thereof and of ending the exposure of the display target pixel row 62 thereof, changing the display target pixel row 62.

The first rolling readout drive is a drive that sequentially reads out, for each pixel row 62, pixel signal corresponding to the charge held in the charge holder 61B by the global shutter drive.

The second rolling readout drive is a drive that sequentially performs the readout of pixel signal corresponding to the charge held in the charge holder 61B of the display target pixel row 62 by rolling shutter drive, changing the display target pixel row 62.

In a case where the digital camera 100 is set to an imaging mode, the imaging controller 11A continuously performs imaging for the live view image display (hereinafter referred to as an LV imaging) by a set of the rolling reset drive, rolling shutter drive, and second rolling readout drive.

During the execution of the set, upon receiving an instruction (hereinafter, referred to as an imaging instruction) to perform an imaging for a storage for storing still image data in the storage medium 21, the imaging controller 11A performs imaging for the storage by the set of global reset drive, global shutter drive, and the first rolling readout drive, and then performs an imaging for an LV by a first imaging control.

The first imaging control is a control in which the exposure of the pixel 61, started simultaneously with the end of the exposure of all the pixels 61 by the global shutter drive at the time of the imaging for the storage, ends sequentially for each display target pixel row 62 by the rolling shutter drive performed after the end of the first rolling readout drive at the time of the imaging for the storage, and the second rolling readout drive is performed to sequentially read out the pixel signal corresponding to the charge held in the charge holder 61B of the display target pixel row 62 by the rolling shutter drive.

The digital signal processing section 17 shown in FIG. 1 processes the picked up image signal output from the imager 5 by the first rolling readout drive performed by the imaging controller 11A to generate the picked up image data, and to store the picked up image data in the storage medium 21.

In addition, the digital signal processing section 17 processes a pixel signal group sequentially output from the display target pixel row 62 of the imager 5 by the second rolling readout drive performed by the imaging controller 11A to generate line data corresponding to the display pixel row 23B corresponding to the display target pixel row 62, and to transfer the generated line data to the display device controller 22. A set of the line data constitutes the live view image data.

The display controller 11B shown in FIG. 6 performs control of displaying the live view image, based on the live view image data obtained by the second rolling readout drive, on the display surface 23 via the display device controller 22.

Specifically, the display controller 11B generates a display synchronization signal for instruction to start the drawing update processing by the display device controller 22, and supplies the display synchronization signal to the display device controller 22.

The display device controller 22 starts the drawing update processing in a case the display synchronization signal input from the display controller 11B falls.

That is, in a case where the display synchronization signal falls, the display device controller 22 sequentially selects the display pixel row 23B from the upper end toward the lower end of the display surface 23, and draws the line image, based on the line data corresponding to the selected display pixel row 23B, on the selected display pixel row 23B.

Figure 7:
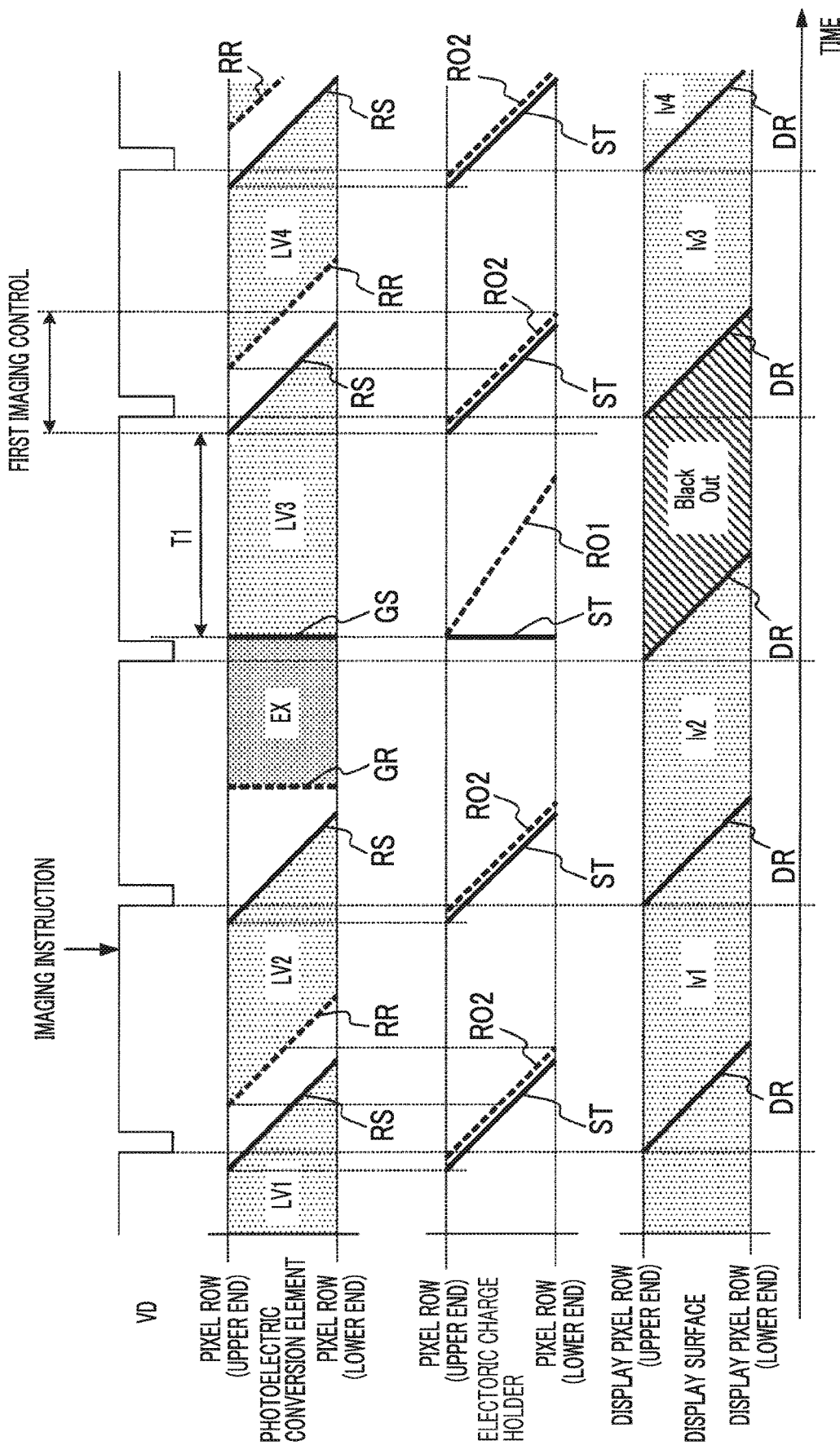
FIG. 7 is a timing chart showing an operation in an imaging mode of the digital camera 100 shown in FIG. 1.

FIG. 7 is a timing chart showing an operation in an imaging mode of the digital camera 100 shown in FIG. 1.

In FIG. 7, a lateral axis represents a time. The display synchronization signal VD supplied from the display controller 11B to the display device controller 22 is shown in an upper part of FIG. 7.

The drive timing of the photoelectric conversion element 61A and the charge holder 61B of each pixel row 62 of the imager 5 is shown in the middle part of FIG. 7. In the middle part of FIG. 7, a vertical axis indicates the position in the column direction Y of the pixel row 62.

A straight line RR shown in the middle part of FIG. 7 indicates the timing when each photoelectric conversion element 61A included in the pixel row 62 is reset by the rolling reset drive.

A straight line RS shown in the middle part of FIG. 7 indicates the timing when the exposure of each photoelectric conversion element 61A included in the pixel row 62 is ended by the rolling shutter drive.

A period surrounded by the straight line RR and the straight line RS right next to the straight line RR indicates an exposure period (LV1, LV2, LV4) of the imager 5 at the time of the LV imaging.

A straight line GR shown in the middle part of FIG. 7 indicates the timing when each photoelectric conversion element 61A included in the pixel row 62 is reset by the global reset drive.

A straight line GS shown in the middle part of FIG. 7 indicates the timing when the charge is transferred from the photoelectric conversion elements 61A included in the pixel row 62 to the charge holder 61B by the global shutter drive.

A period surrounded by the straight line GR and the straight line GS indicates the exposure period EX of the imager 5 at the time of the imaging for the storage.

A straight line ST shown in the middle part of FIG. 7 indicates the timing when the charge is held in the charge holder 61B.

A straight line RO1 shown in the middle part of FIG. 7 indicates the timing when the pixel signal corresponding to the charge held in the charge holder 61B is output from the imager 5 by the first rolling readout drive.

A straight line RO2 shown in the middle part of FIG. 7 indicates the timing when the pixel signal corresponding to the charge held by the charge holder 61B is output from the imager 5 by the second rolling readout drive.

The lower part of FIG. 7 shows a drawing state of the display surface 23. In the lower part of FIG. 7, the vertical axis indicates the position of the display pixel row 23B of the display surface 23 in the column direction Y.

A straight line DR shown in the lower part of FIG. 7 indicates the timing when the drawing is performed on the display pixel row 23B of the display surface 23.

Upon the setting of the imaging mode, the imaging controller 11A repeatedly executes a set of the rolling reset drive indicated by the straight line RR, the rolling shutter drive indicated by the straight line RS, and the second rolling readout drive indicated by the straight line RO2 at a predetermined interval.

In a case where the pixel signal is output from the display target pixel row 62 by the drive indicated by the straight line RO2 of the set, the line data is generated based on the pixel signal, and the line image based on the line data is drawn on the display pixel row 23B corresponding to the display target pixel row 62.

"lv1" shown in FIG. 7 indicates a period in which the live view image obtained in the exposure period LV1 is displayed.

"lv2" shown in FIG. 7 indicates a period in which the live view image obtained in the exposure period LV2 is displayed.

"lv4" shown in FIG. 7 indicates a period in which the live view image obtained in the exposure period LV4 is displayed.

In a case where the imaging instruction is issued while the above described set for the LV imaging is performed, the imaging controller 11A ends the above described set during the execution at the time of receiving the imaging instruction, then performs the global reset drive indicated by the straight line GR, and simultaneously performs the reset of the photoelectric conversion elements 61A in all the pixel rows 62. Accordingly, the exposure starts at the same timing in all the pixel rows 62.

Thereafter, in a case where a predetermined exposure time has elapsed, the imaging controller 11A performs the global shutter drive indicated by the straight line GS.

By the drive, the charges are transferred from the photoelectric conversion element 61A to the charge holder 61B simultaneously in all the pixel rows 62, and the charge holder 61B holds the charge as indicated by the straight line ST. Accordingly, the exposure ends at the same timing in all the pixel rows 62. In FIG. 7, the period surrounded by the straight line GR and the straight line GS is shown as the exposure period EX for the imaging for the storage.

In addition, in a case where the global shutter drive is performed, the charge generated in the exposure period EX in each photoelectric conversion element 61A is transferred to the charge holder 61B. Therefore, the exposure for the LV imaging of all the photoelectric conversion elements 61A simultaneously starts with the global shutter drive being performed.

After the global shutter drive indicated by the straight line GS is performed, the imaging controller 11A performs the first rolling readout drive indicated by the straight line RO1.

In the first rolling readout drive, the imaging controller 11A selects the pixel row 62 in order from the upper end toward the lower end of the imaging surface 60, and reads out the pixel signal from the selected pixel row 62.

The picked up image signal output from the imager 5 in the first rolling readout drive is processed by the digital signal processing section 17 to be the picked up image data, and to be stored in the storage medium 21.

In a case where the readout of the pixel signal by the straight line RO1 ends, the imaging controller 11A starts the rolling reset drive indicated by the straight line RS. By the rolling reset drive, the display target pixel row 62 is selected in order from the upper end toward the lower end of the imaging surface 60, and the charge is transferred from the photoelectric conversion element 61A of the selected display target pixel row 62 to the charge holder 61B.

Accordingly, the exposure for the LV imaging started at the time when the global shutter drive is performed sequentially ends for each display target pixel row 62. In FIG. 7, a period surrounded by the straight line GS and a straight line RS right next to the straight line GS is shown as an exposure period LV3 for the LV imaging.

The start timing of the rolling reset drive for ending the exposure period LV3 is a timing synchronized with a falling timing of the display synchronization signal VD that comes first after the end of the first rolling readout drive indicated by the straight line RO1.

A second timing synchronized with a first timing refers to a timing prior to the first timing by a predetermined time.

The predetermined time is a time that it takes from the start of the rolling shutter drive until the line data generated first by the digital signal processing section 17 is stored in the display memory of the display device controller 22, and is determined by a processing capacity and a data transmission time of the various types of processors.

The imaging controller 11A starts the rolling reset drive for ending the exposure period LV3 and, after a short time, starts the second rolling readout drive indicated by the straight line RO2.

By the second rolling readout drive, the display target pixel row 62 is selected in order from an upper end side toward a lower end side in the imaging surface 60, and the pixel signal is read out from the charge holder 61B of the selected display target pixel row 62.

In a case where the pixel signal is output from the display target pixel row 62 by the second rolling readout drive, the line data is generated based on the pixel signal, and the line image based on the line data is drawn on the display pixel row 23B corresponding to the display target pixel row 62.

An "lv3" shown in FIG. 7 indicates a period in which the live view image obtained in the exposure period LV3 is displayed.

The first imaging control includes the rolling shutter drive for ending the exposure period LV3, and the second rolling readout drive that converts the charge transferred to the charge holder 61B by the rolling shutter drive to the pixel signal and reads out the pixel signal.

Note that the display synchronization signal VD falls in the exposure period EX in the example of FIG. 7, but no new live view image data is generated at this timing.

Therefore, the display device controller 22 sets the line image, drawn on each display pixel row 23B of the display surface 23 at this timing, as a black image. Accordingly, the display surface 23 is in a blackout state between the period lv2 and the period lv3.

The display device controller 22 may perform the control of maintaining the line image displayed in the period lv2 without updating the line image drawn on each display pixel row 23B of the display surface 23 at this timing.

A little after the second rolling readout drive of the first imaging control is started, the imaging controller 11A resumes the above described set for the LV imaging.

As described above, according to the digital camera 100 of FIG. 1, the exposure period LV3 for the LV imaging can be started simultaneously with the end of the exposure period EX for imaging for the storage.

Therefore, it is possible to shorten the time until the live view image is updated after the exposure period EX (a blackout time in the drawing), and it is possible to reduce the risk of losing sight of the subject.

Note that as shown in FIG. 7, the exposure time of each pixel row 62 in the exposure period LV 3 becomes short as the upper end in the imaging surface 60 comes close.

Therefore, the digital signal processing section 17 of the digital camera 100 corrects each line data, generated from the pixel signal obtained by the second rolling readout drive of the first imaging control so as to eliminate a brightness difference due to the difference of the exposure period for each display target pixel row 62.

Specifically, the digital signal processing section 17 multiplies gain (Gain (i)) calculated by a following Expression, by each pixel data of the line data corresponding to the i-th display target pixel row 62 counted from the upper end of the imaging surface 60, so to perform the above described correction.

$$\text{Gain}(i) = [(\text{EXP1} - \text{EXP0}) \times \{(m-i)/m\}]/\text{EXP0} + 1$$

In the above Expression, "EXP0" indicates the exposure time in the exposure period LV3 of the display target pixel row 62 on an uppermost end side of the imaging surface 60. The above described "EXP1" indicates the exposure time in the exposure period LV3 of the display target pixel row 62 on a lowermost end side of the imaging surface 60. The above described "m" indicates the total number of the display target pixel rows 62.

Here, by setting, as a reference, a brightness of the line data corresponding to the m-th display target pixel row 62 counted from the upper end of the imaging surface 60, the brightness of the other line data is set to match the reference.

However, a correction method is not limited to this, and for example, by setting, as the reference, the brightness of the line data corresponding to the first display target pixel row 62 counted from the upper end of the imaging surface 60, the brightness of the other line data may be set to match the above described reference.

Subsequently, an example, in which the imaging controller 11A performs the second imaging control in addition to the first imaging control described above as the imaging control performed after the imaging for the storage according to the imaging instruction, will be described.

The second imaging control is to perform the above described set (the set of the rolling reset drive, the rolling shutter drive, and the second rolling readout drive) following the imaging for the storage.

Figure 8:
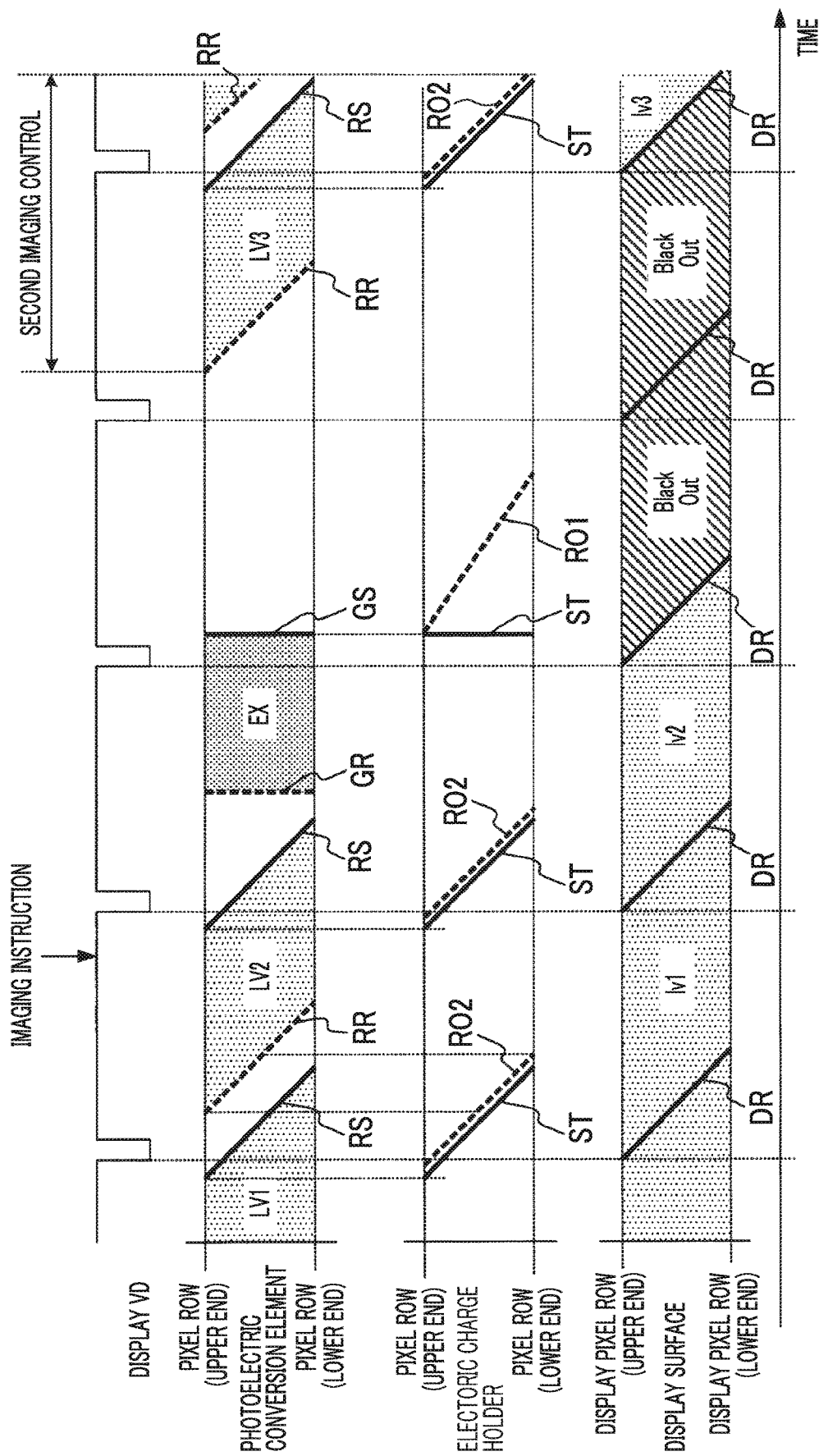
FIG. 8 is a timing chart showing a modification example of the operation in the imaging mode of the digital camera 100 shown in FIG. 1.

FIG. 8 is a timing chart showing a modification example of the operation in an imaging mode of the digital camera 100 shown in FIG. 1. Reference numerals, signs and notations shown in FIG. 8 are the same as in FIG. 7.

Upon the setting of the imaging mode, the imaging controller 11A repeatedly executes the set of the rolling reset drive indicated by the straight line RR, the rolling shutter drive indicated by the straight line RS, and the second rolling readout drive indicated by the straight line RO2 at the predetermined interval. The operation when the set is performed is the same as that of FIG. 7.

In a case where the imaging instruction is issued while the above described set for the LV imaging is performed, the imaging controller 11A ends the above described set during the execution at the time of receiving the imaging instruction, and then performs the global reset drive indicated by the straight line GR. Thereafter, in a case where a predetermined exposure time has elapsed, the imaging controller 11A performs the global shutter drive indicated by the straight line GS.

After the global shutter drive indicated by the straight line GS is performed, the imaging controller 11A performs the first rolling readout drive indicated by the straight line RO1.

The picked up image signal output from the imager 5 by the first rolling readout drive is processed by the digital signal processing section 17 to be the picked up image data, and to be stored in the storage medium 21.

In a case where the readout of the pixel signal by the straight line RO1 ends, the imaging controller 11A starts the rolling reset drive indicated by the straight line RR, and then performs the rolling shutter drive to end the exposure period LV3 of the LV imaging.

The start timing of the rolling shutter drive for ending the exposure period LV3 is a timing synchronized with a falling timing of the display synchronization signal VD that comes for the second time after the end of the first rolling readout drive indicated by the straight line RO1.

After starting the rolling shutter drive indicated by the straight line RS of the second imaging control, the imaging controller 11A performs the second rolling readout drive, and reads out the pixel signal from the display target pixel row 62 exposed in the exposure period LV3.

In a case where the pixel signal is output from the display target pixel row 62 by the second rolling readout drive, the line data is generated based on the pixel signal, and the line image based on the line data is drawn on the display pixel row 23B corresponding to the display target pixel row 62.

The second imaging control includes the rolling reset drive performed first after the global shutter drive, and the rolling shutter drive and the second rolling readout drive performed thereafter.

Note that the display synchronization signal VD falls before the start of the exposure period LV3 in the example of FIG. 8, and no new live view image data is generated at this timing.

Therefore, the display device controller 22 sets the line image, drawn on each display pixel row 23B of the display surface 23 at this timing, as the black image. Accordingly, the display surface 23 is in the blackout state for two frames between the period lv2 and the period lv3.

According to the second imaging control shown in FIG. 8, although the blackout time between the period lv2 and the period lv3 is longer than in a case of performing the first imaging control, the exposure for the LV imaging immediately after the imaging for the storage (the exposure period LV3) can be implemented by a proper exposure such that the pixel signal output from the pixel 61 of the imager 5 is not saturated, and a high quality of the live view image can be expected, which is an advantage to obtain.

Therefore, by selectively performing the first imaging control and the second imaging control according to the imaging condition or the like at the time of the imaging for the storage, it is possible to achieve both of a reduction in the risk of losing the subject and an improvement in the quality of the live view image.

Figure 9:
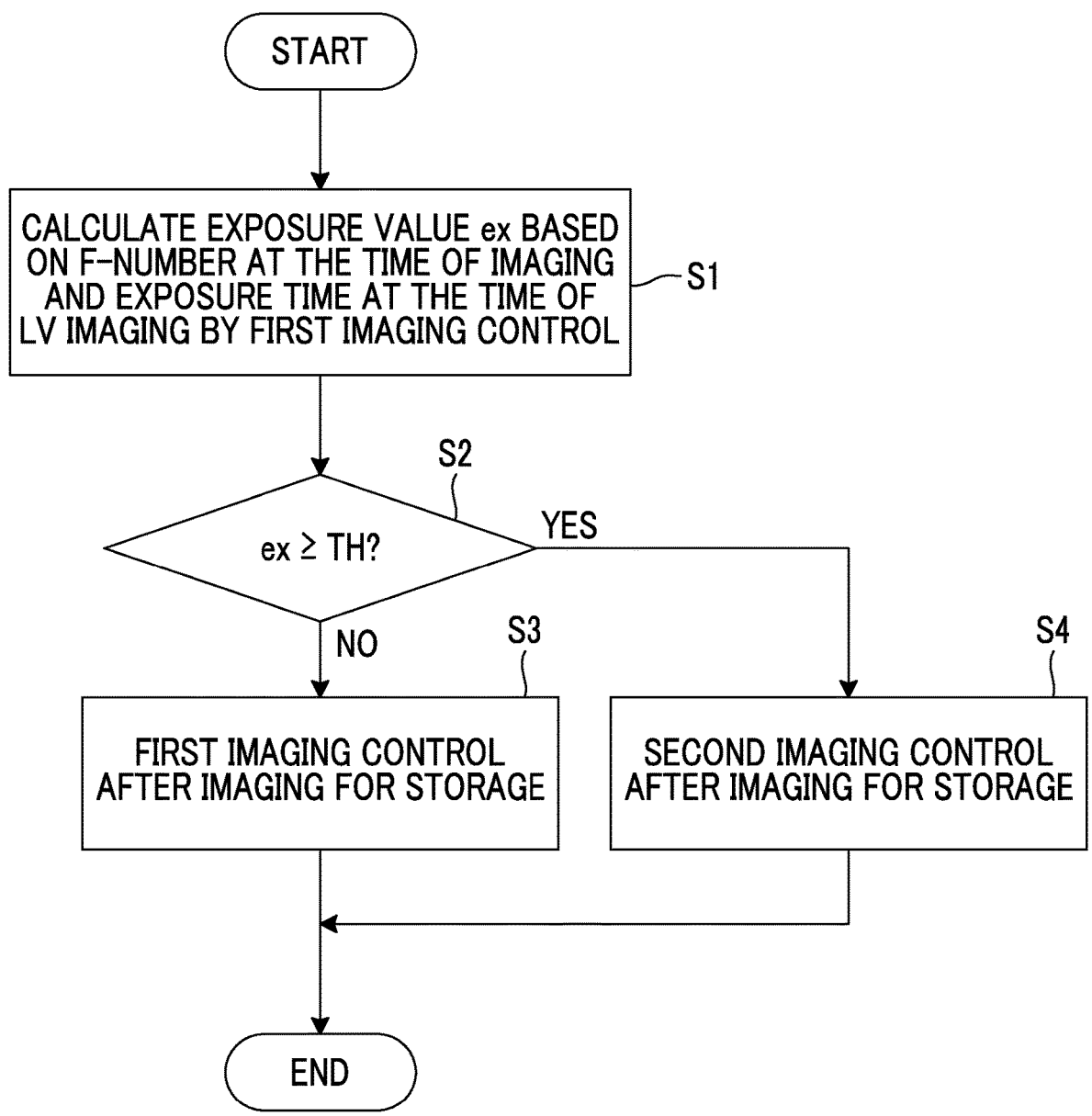
FIG. 9 is a flowchart for describing an operation of an imaging controller 11A of the digital camera 100 shown in FIG. 1.

FIG. 9 is a flowchart for describing an operation of an imaging controller 11A of the digital camera 100 shown in FIG. 1.

The imaging controller 11A that has received the imaging instruction calculates an exposure value ex at the time of the LV imaging in a case of performing the first imaging control, based on the time between the global shutter drive start timing for imaging for the storage and the rolling shutter drive start timing for performing the first imaging control thereafter (the exposure time T1 shown in FIG. 7), and the F-Number of the stop set at the time of global reset drive in the case of performing the imaging for the storage (hereinafter referred to as the F-Number at the time of the imaging) (step S1).

In FIG. 7, in a case where the timing of the imaging instruction is determined, the timing of the straight line GR, the timing of the straight line GS, and the timing of the straight line RS right next to the straight line GS are respectively determined, so that the exposure time T1 can be obtained.

Subsequently, the imaging controller 11A selects and executes either the first imaging control or the second imaging control based on the exposure value ex obtained in step S1.

Specifically, the imaging controller 11A determines whether the exposure value ex is equal to or more than a predetermined exposure threshold value TH (a first exposure threshold value) (step S2).

For the exposure threshold value TH, a lower limit value of the exposure value, at which the pixel signal read out from the pixel 61 of the imager 5 reaches a saturation level, is set.

Then, in a case where the exposure value ex is less than the exposure threshold value TH (step S2: NO), the imaging controller 11A performs the first imaging control after the imaging for the storage is performed by the global reset drive, the global shutter drive, and the first rolling readout drive as shown in FIG. 7 (step S3).

On the other hand, in a case where the exposure value ex is equal to or more than the exposure threshold value TH (step S2: YES), the imaging controller 11A performs the second imaging control after the imaging for the storage is performed by the global reset drive, the global shutter drive, and the first rolling readout drive as shown in FIG. 8 (step S4).

In a case of performing the second imaging control is performed in step S4, between when the exposure period EX ends and when the rolling reset drive starts, the imaging controller 11A controls the F-Number of the stop and the exposure time at the time of the LV imaging or the like such that the LV imaging is performed with a proper exposure, and then starts the second imaging control. Therefore, the live view image displayed in the period lv3 of FIG. 8 is obtained by the imaging with the proper exposure.

As described above, according to the digital camera 100 of FIG. 1, as a result of performing the first imaging control by the F-Number at the time of the imaging that is determined at the time of the imaging instruction, in a case where the exposure at the time of the LV imaging is determined to be excessive so as to decrease the quality of the live view image, the second imaging control is performed. Therefore, it is possible to prevent the decrease of the display quality of the live view image displayed immediately after the imaging for the storage.

Figure 10:
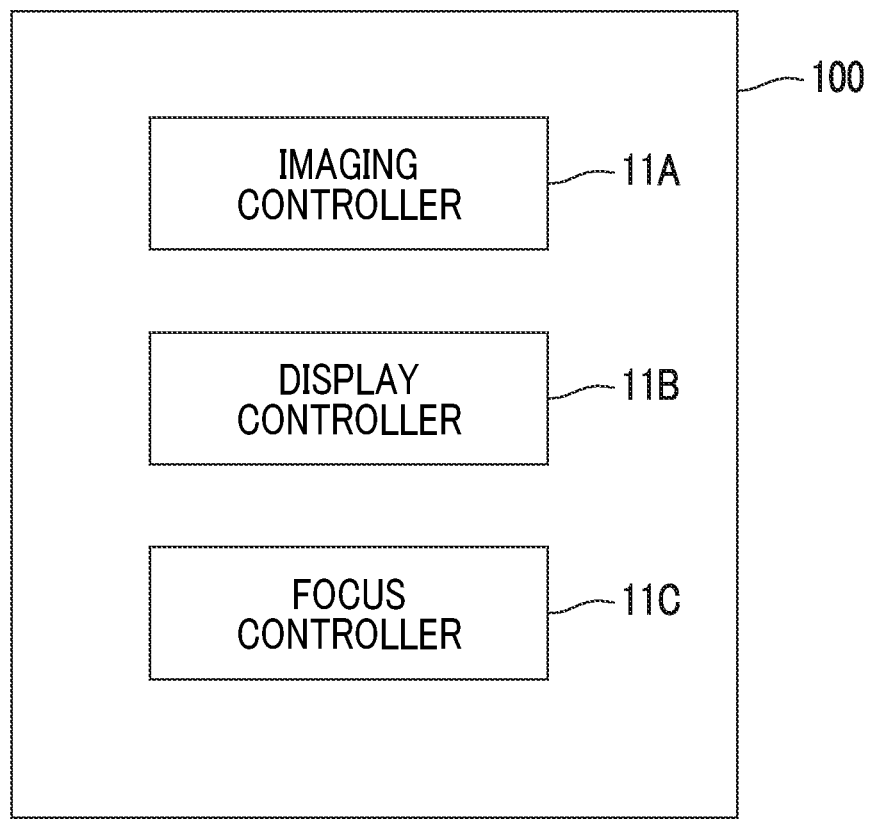
FIG. 10 is a diagram showing a modification example of a functional block of the digital camera 100 shown in FIG. 1.

FIG. 10 is a diagram showing a modification example of a functional block of the digital camera 100 shown in FIG. 1. The same reference numerals and signs as those in FIG. 6 denote the same components in FIG. 10.

The hardware configuration of the digital camera 100 shown in FIG. 10 differs from that in FIG. 1 only in that the plurality of pixels 61 of the imager 5 includes phase difference detection pixels and normal pixels.

A phase difference detection pixel is a first phase difference detection pixel that receives light passing through one of two divided regions in a case where a pupil region of the imaging optical system is divided into two in the row direction X or the column direction Y, and a second phase difference detection pixel that receives light passing through the other of the two divided regions.

A normal pixel is a pixel that receives light passing through each of the two divided regions.

In the imager 5 of the digital camera 100 shown in FIG. 10, parts of the pixels 61 constituting the m display target pixel rows 62 on the imaging surface 60 become the first phase difference detection pixel and the second phase difference detection pixel.

A plurality of pairs of first phase difference detection pixels and second phase difference detection pixels are discretely disposed on the imaging surface 60 of the imager 5.

A configuration may be used, in which the photoelectric conversion elements 61A of all the pixels 61 included in the imager 5 are divided into, for example, two in the row direction X, and by one region and the other region of the divided photoelectric conversion elements 61A, the light, passing through each of the two divided regions of the above described imaging optical system, is received. In the case of this configuration, all the pixels 61 included in the imager 5 become the phase difference detection pixels.

The digital camera 100 comprises an imaging controller 11A, a display controller 11B as the functional block, and a focus controller 11C.

The system control section 11 functions as the imaging controller 11A, the display controller 11B, and the focus controller 11C by executing the program including the imaging program.

The focus controller 11C performs a focus control of the imaging optical system based on the pixel signal output from the phase difference detection pixel of the imager 5 by the second rolling readout drive performed by the imaging controller 11A.

Specifically, the focus controller 11C performs a correlation calculation of the pixel signal group output from the plurality of first phase difference detection pixels, and the pixel signal group output from the second phase difference detection pixels respectively paired with the plurality of first phase difference detection pixels, and calculates a phase difference to perform a focus adjustment of the focus lens according to the amount of defocus based on the phase difference.

Figure 11:
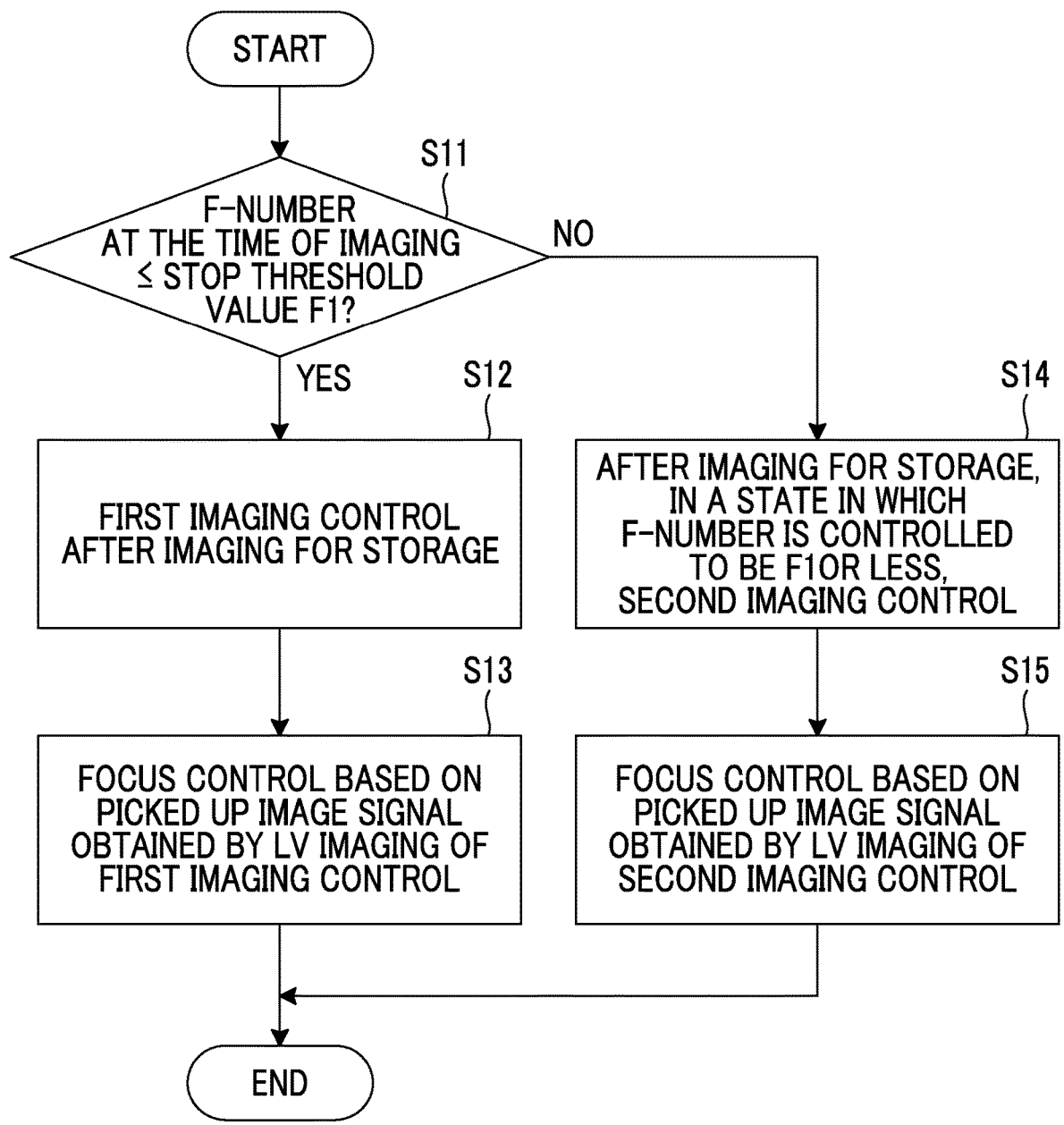
FIG. 11 is a flowchart for describing an operation after an imaging instruction of the digital camera shown in FIG. 10.

FIG. 11 is a flowchart for describing an operation after an imaging instruction of the digital camera shown in FIG. 10.

The imaging controller 11A that receives the imaging instruction determines whether the F-Number (the F-Number at the time of the imaging) of the stop set at the time of the global reset drive is equal to or less than the predetermined stop threshold value F1 (step S11).

Between the image picked up by the plurality of first phase difference detection pixels and the image picked up by the plurality of second phase difference detection pixels, the difference in phase becomes great as the F-Number becomes small, and thus as the F-Number becomes small, a calculation precision of the phase difference is secured. For the stop threshold value F1, a value on an open side of the F-Number, in which a minimum calculation precision of the phase difference can be secured, is set.

In a case where the F-Number at the time of the imaging exceeds the stop threshold value F1 (step S11: NO), the imaging controller 11A performs the imaging for the storage by the global reset drive, the global shutter drive, and the first rolling readout drive, and after the start of the global shutter drive, controls the F-Number of the stop to be the stop threshold value F1 or less. Then, after the first rolling readout drive ends, the imaging controller 11A performs the second imaging control (step S14).

In a case where the second rolling readout drive of the second imaging control ends, the focus controller 11C performs the focus control based on the pixel signal read out from the phase difference detection pixel by the second rolling readout drive (Step S15).

On the other hand, in a case the F-Number at the time of the imaging is equal to or less than the stop threshold value F1 (step S11: YES), the imaging controller 11A performs the first imaging control after the global reset drive, the global shutter drive, and the first rolling readout drive are performed as shown in FIG. 7 (step S12).

In a case where the second rolling readout drive of the first imaging control ends, the focus controller 11C performs the focus control based on the pixel signal read out from the phase difference detection pixel by the second rolling readout drive (Step S13). After step S13 and step S14, the above described set is resumed.

As described above, according to the digital camera 100 shown in FIG. 10, in a case where the F-Number at the time of the imaging is suitable for the phase difference calculation, a high-speed display of the live view image is performed by the first imaging control and a high-speed focus control can be performed based on the picked up image signal obtained by the first imaging control.

Therefore, for example, in a continuous shooting mode in which the imaging for the storage is continuously performed, it is possible to reduce the risk of losing sight of the subject and to perform a continuous imaging focusing on the subject with the high precision.

Further, according to the digital camera 100 shown in FIG. 10, in a case where the F-Number at the time of the imaging is not suitable for the phase difference calculation, the second imaging is performed in a state in which the F-Number is controlled to be the stop threshold value F, 1 or less, and the focus control is performed based on the picked up image signal obtained by the second imaging control.

Therefore, a possibility that the phase difference is erroneously calculated can be reduced, and a focus performance can be improved.

Figure 12:
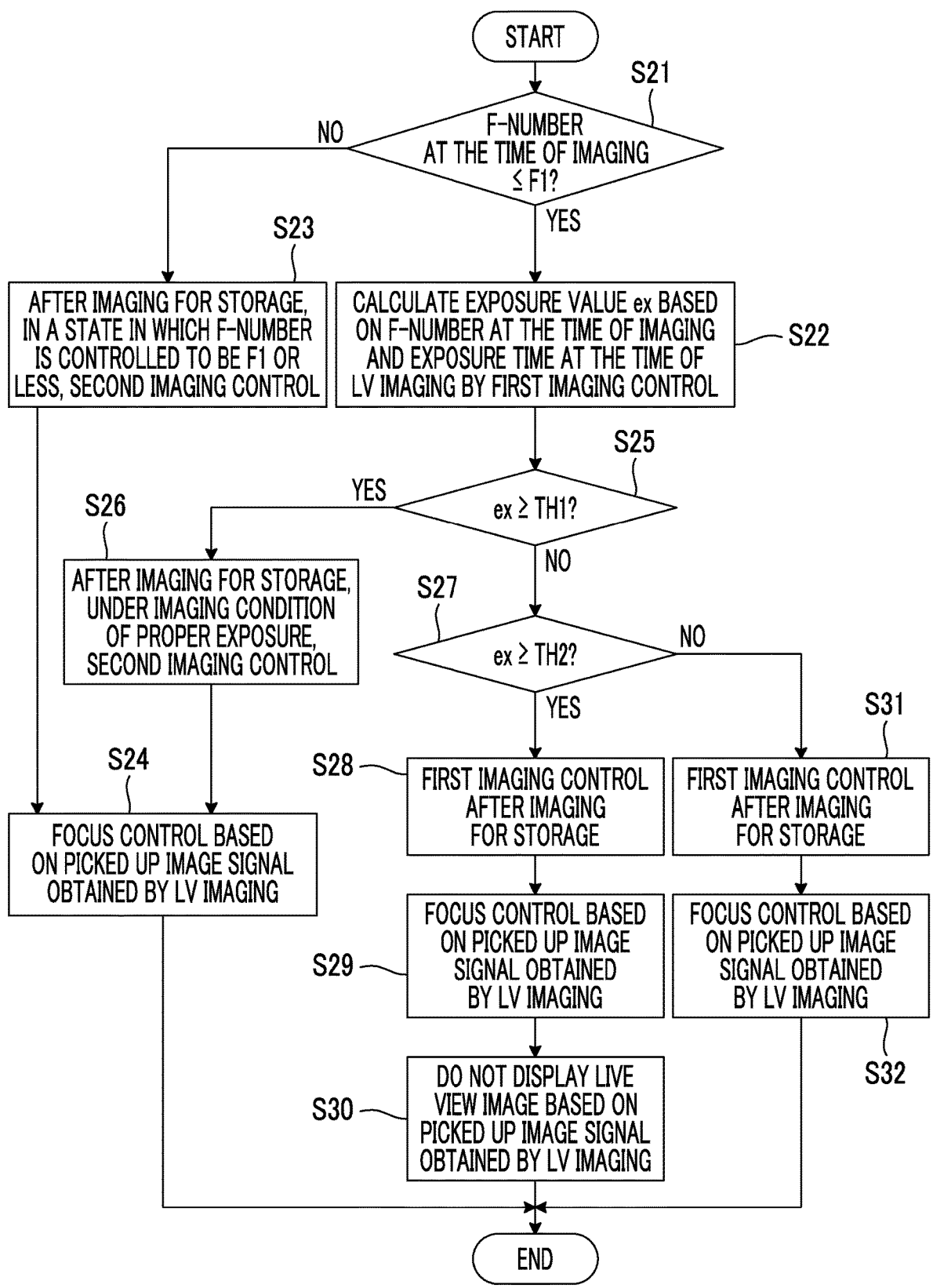
FIG. 12 is a flowchart for describing a modification example of the operation after the imaging instruction of the digital camera shown in FIG. 10.

FIG. 12 is a flowchart for describing a modification example of the operation after the imaging instruction of the digital camera shown in FIG. 10.

The imaging controller 11A that has received the imaging instruction determines whether the F-Number at the time of the imaging is equal to or less than the stop threshold value F1 (step S21).

In a case where the F-Number at the time of the imaging exceeds the stop threshold value F1 (step S21: NO), the imaging controller 11A performs the global reset drive and the global shutter drive for the imaging for the storage, and then controls the F-Number of the stop to be the stop threshold value F1 or less, and performs the second imaging control after the first rolling readout drive ends (step S23).

In a case where the second rolling readout drive of the second imaging control ends, the focus controller 11C performs the focus control based on the pixel signal read out from the phase difference detection pixel by the second rolling readout drive (Step S24).

In a case where the F-Number at the time of the imaging is equal to or less than the stop threshold value F1 (step S21: YES), the imaging controller 11A calculates the exposure value ex at the time of the LV imaging in the case of performing the first imaging control, based on the time between the global shutter drive start timing for imaging for the storage and the rolling shutter drive start timing for performing the first imaging control thereafter (the exposure time T1 shown in FIG. 7), and the F-Number at the time of the imaging (step S22).

Subsequently, the imaging controller 11A determines whether the exposure value ex is equal to or more than a predetermined exposure threshold value TH1 (the first exposure threshold value) (step S25).

For the exposure threshold value TH1, the lower limit value of the exposure value, at which the pixel signal read out from the phase difference detection pixel of the imager 5 reaches the saturation level, is set.

In the phase difference detection pixel, since a light receiving area of the photoelectric conversion element 61A is smaller than that of the normal pixel, the pixel signal is unlikely to be saturated. Therefore, under the exposure condition in which the phase difference detection pixel is saturated, the normal pixel is also saturated.

In a case where the exposure value ex is equal to or more than the exposure threshold value TH1 (step S25: YES), that is, in a case where both of the normal pixel and the phase difference detection pixel are saturated, the imaging controller 11A performs the imaging for the storage by the global reset drive, the global shutter drive, and the first rolling readout drive, and then performs the second imaging control shown in FIG. 8 in a state in which the exposure time for the LV imaging is controlled to be a value at which the proper exposure can be obtained (Step S26).

After step S26, in step S24, the focus control is performed based on the picked up image signal obtained by the second imaging control of step S26.

In a case where the exposure value ex is less than the exposure threshold value TH1 (step S25: NO), that is, in a case where at least the phase difference detection pixel is not saturated, the imaging controller 11A determines whether the exposure value ex is equal to or more than a predetermined exposure threshold value TH2 (a second exposure threshold value) (step S27).

For the exposure threshold value TH2, a lower limit value of the exposure value, at which the pixel signal read out from the normal pixel of the imager 5 reaches a saturation level, is set.

As described above, the normal pixel is more likely to be saturated than the phase difference detection pixel. Therefore, the exposure threshold value TH2 becomes smaller than the exposure threshold value TH1.

In a case where the exposure value ex is equal to or more than the exposure threshold value TH2 (step S27: YES), that is, in a case where the normal pixel is saturated but the phase difference detection pixel is not saturated, the imaging controller 11A performs the imaging for the storage by the global reset drive, the global shutter drive, and the first rolling readout drive, and then performs the first imaging control, as shown in FIG. 7 (step S28).

In a case where the second rolling readout drive of the first imaging control that starts in step S28 ends, the focus controller 11C performs the focus control based on the pixel signal read out from the phase difference detection pixel by the second rolling readout drive (step S29).

In addition, with respect to the live view image based on the picked up image signal output from the imager 5 by the second rolling readout drive of the first imaging control in step S28, the display controller 11B performs the control of stopping the display on the display surface 23 (step S30).

Figure 13:
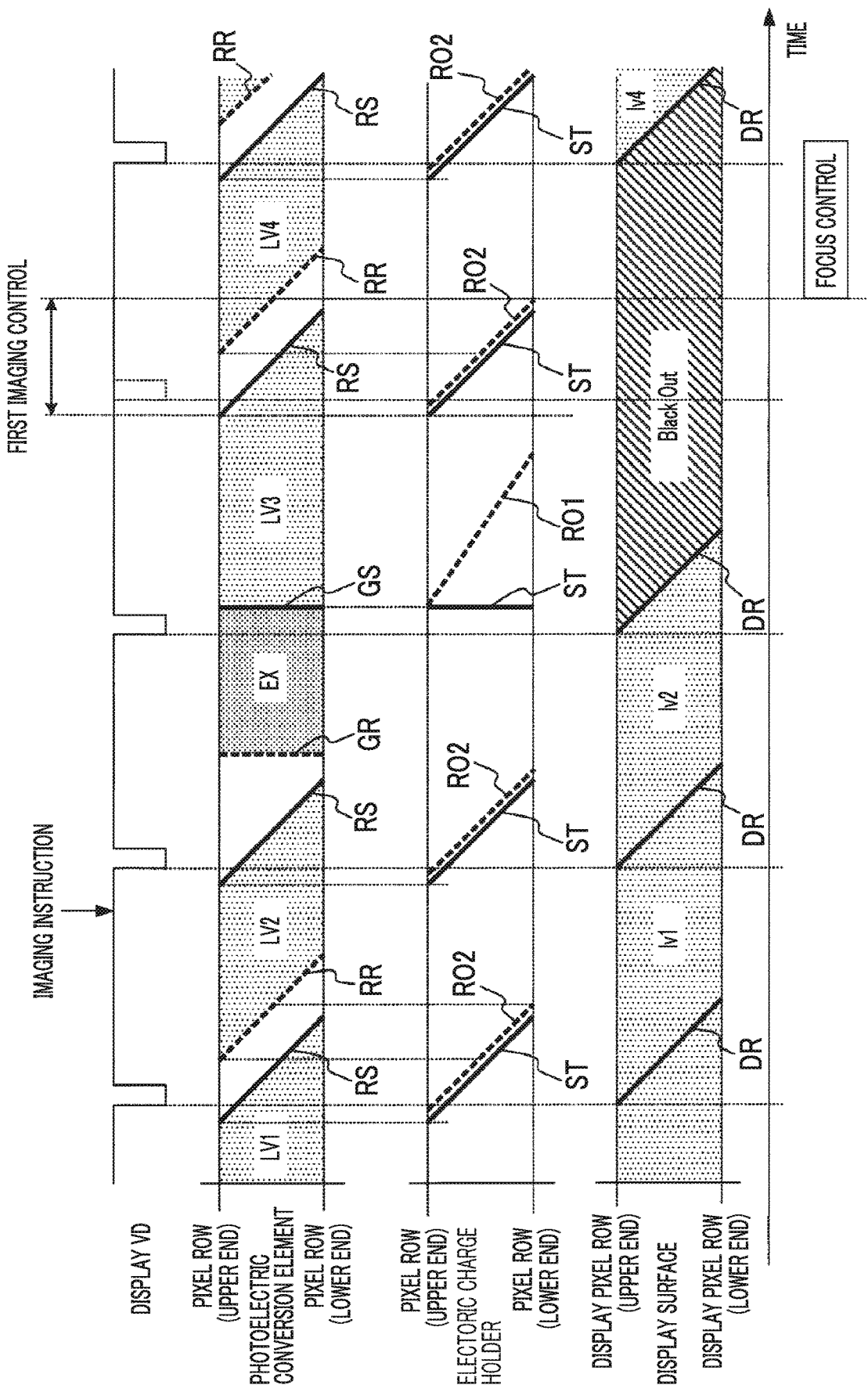
FIG. 13 shows a timing chart in a case where a determination in step S27 of FIG. 12 is YES.

FIG. 13 shows an example of a timing chart in a case where a determination in step S27 of FIG. 12 is YES.

In this timing chart, after the imaging instruction, a cycle of the display synchronization signal VD generated by the display controller 11B is temporarily changed to be doubled. Accordingly, the live view image generated by the second rolling readout drive of the first imaging control is not displayed on the display surface 23.

Note that a "focus control" block in FIG. 13 indicates a period in which the processing of step S29 in FIG. 12 is performed.

In a case where the exposure value ex is less than the exposure threshold value TH2 (step S27: NO), that is, in a case where neither the normal pixel nor the phase difference detection pixel is saturated, the imaging controller 11A performs the imaging for the storage by the global reset drive, the global shutter drive, and the first rolling readout drive, and then performs the first imaging control, as shown in FIG. 7 (step S31).

In a case where the second rolling readout drive of the first imaging control that starts in step S31 ends, the focus controller 11C performs the focus control based on the pixel signal read out from the phase difference detection pixel by the second rolling readout drive (step S32).

After step S24, step S30 and step S32, the set for the above described LV imaging starts.

As described above, according to an operation example shown in FIG. 12, in a case where the F-Number at the time of the imaging is not suitable for the phase difference calculation (step S21: NO), the second imaging is performed in a state in which the F-Number is controlled to be the stop threshold value F1 or less, and the phase difference is calculated based on the picked up image signal obtained by the second imaging control. Therefore, a possibility that the phase difference is erroneously calculated can be reduced, and a focus performance can be improved.

In addition, according to the operation example shown in FIG. 12, in a case where the F-Number at the time of the imaging is suitable for the phase difference calculation, but any of the phase difference detection pixel and the normal pixel may be saturated (step S25: YES), the second imaging control is performed in a state in which the proper exposure is secured, and the phase difference is calculated based on the picked up image signal obtained by the second imaging control.

Therefore, a possibility that the phase difference is erroneously calculated can be reduced, and a focus performance can be improved. In addition, the display quality can be improved by preventing the display of the live view image obtained by the LV imaging in a state in which the phase difference detection pixel and the normal pixel are saturated.

In addition, according to the operation example shown in FIG. 12, in a case where the F-Number at the time of the imaging is suitable for calculating the phase difference, and at least that the phase difference detection pixel is determined to be not saturated (step S25: NO), the first imaging control is performed, and the focus control is performed based on the picked up image signal obtained by the first imaging control. Therefore, a focus speed can be improved.

Further, according to the operation example shown in FIG. 12, in a case where the F-Number at the time of the imaging is suitable for the phase difference calculation, and a determination is made that the normal pixel is saturated, but the phase difference detection pixel is not saturated (step In S27: YES), the first imaging control is performed, and the display of the live view image by the first imaging control is stopped. Therefore, it is possible to prevent the decrease of the display quality of the live view image.

Figure 14:
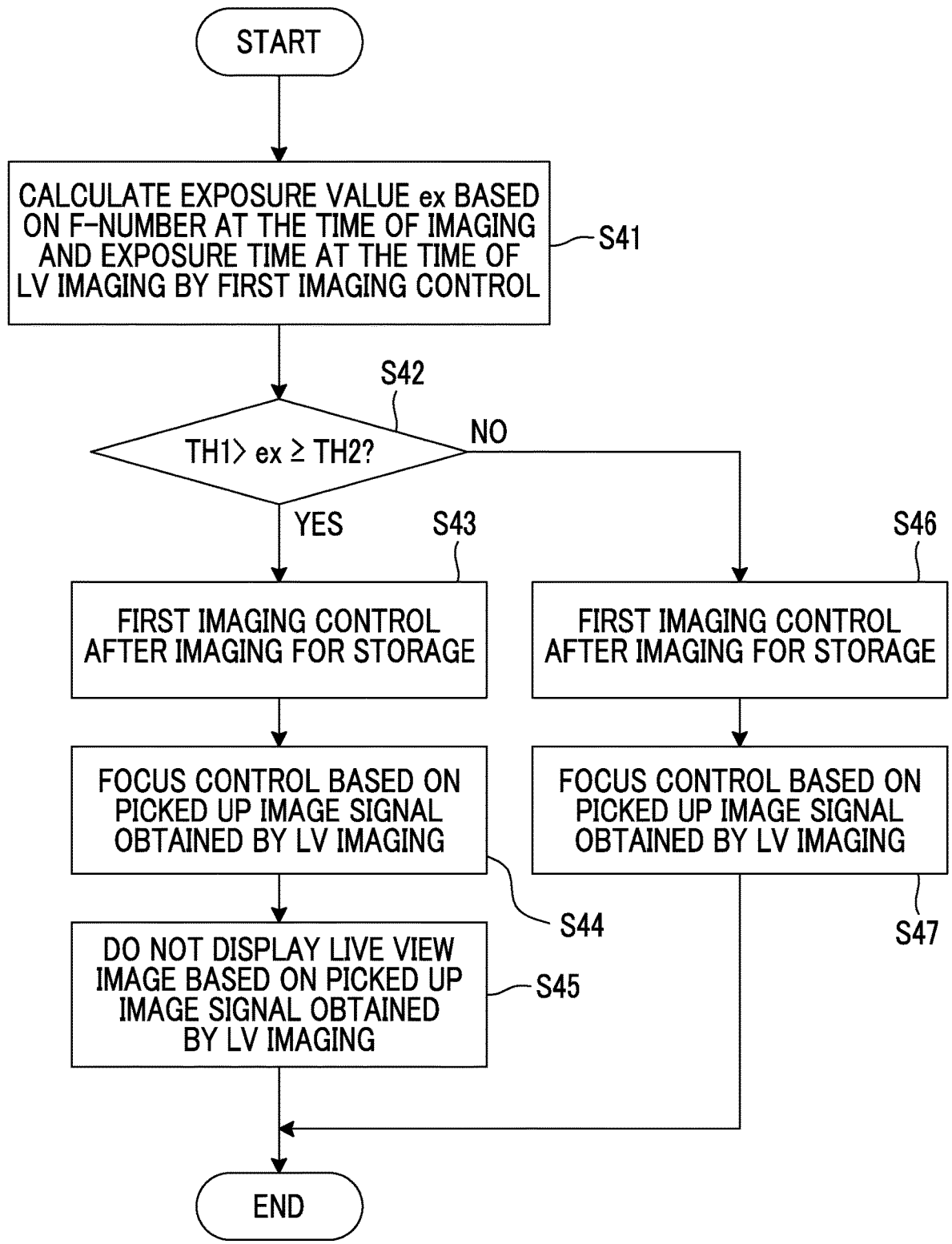
FIG. 14 is a flowchart for describing another modification example of the operation after the imaging instruction of the digital camera 100 shown in FIG. 10.

FIG. 14 is a flowchart for describing another modification example of the operation after the imaging instruction of the digital camera 100 shown in FIG. 10.

The imaging controller 11A that has received the imaging instruction calculates the exposure value ex as in step S1 of FIG. 9 (step S41).

Subsequently, the imaging controller 11A determines whether the exposure value ex is equal to or more than the predetermined exposure threshold value TH2 and is less than the exposure threshold value TH1 (step S42).

In a case where the exposure value ex is equal to or more than the exposure threshold value TH2 and is less than the exposure threshold value TH1 (step S42: YES), that is, in a case where the normal pixel is saturated but the phase difference detection pixel is not saturated, the imaging controller 11A performs the imaging for the storage by the global reset drive, the global shutter drive, and the first rolling readout drive, and then performs the first imaging control, as shown in FIG. 7 (step S43).

In a case where the second rolling readout drive of the first imaging control that starts in step S43 ends, the focus controller 11C performs the focus control based on the pixel signal read out from the phase difference detection pixel by the second rolling readout drive (step S44).

In addition, with respect to the live view image based on the picked up image signal output from the imager 5 by the second rolling readout drive of the first imaging control that starts in step S43, the display controller 11B performs the control of stopping the display on the display surface 23 (step S45).

In a case where the exposure value ex is less than the exposure threshold value TH2 (step S42: NO), that is, in a case where neither the normal pixel nor the phase difference detection pixel is saturated, the imaging controller 11A performs the imaging for the storage by the global reset drive, the global shutter drive, and the first rolling readout drive, and then performs the first imaging control, as shown in FIG. 7 (step S46).

In addition, the live view image, based on the picked up image signal output from the imager 5 by the second rolling readout drive of the first imaging control that starts in step S46, is displayed on the display surface 23.

In a case where the second rolling readout drive of the first imaging control that starts in step S46 ends, the focus controller 11C performs the focus control based on the pixel signal read out from the phase difference detection pixel by the second rolling readout drive (step S47).

After step S45 and step S47, the set for the above described LV imaging starts.

As described above, according to the operation example shown in FIG. 14, in a case where a determination is made that the normal pixel is saturated, but the phase difference detection pixel is not saturated, the first imaging control is performed to secure the focus speed, and the update of the live view image by this first imaging control is stopped. Therefore, it is possible to improve both of the focus speed and the quality of the live view image.

Subsequently, a configuration of a smartphone will be described as an embodiment of the imaging apparatus of the present invention.

Figure 15:
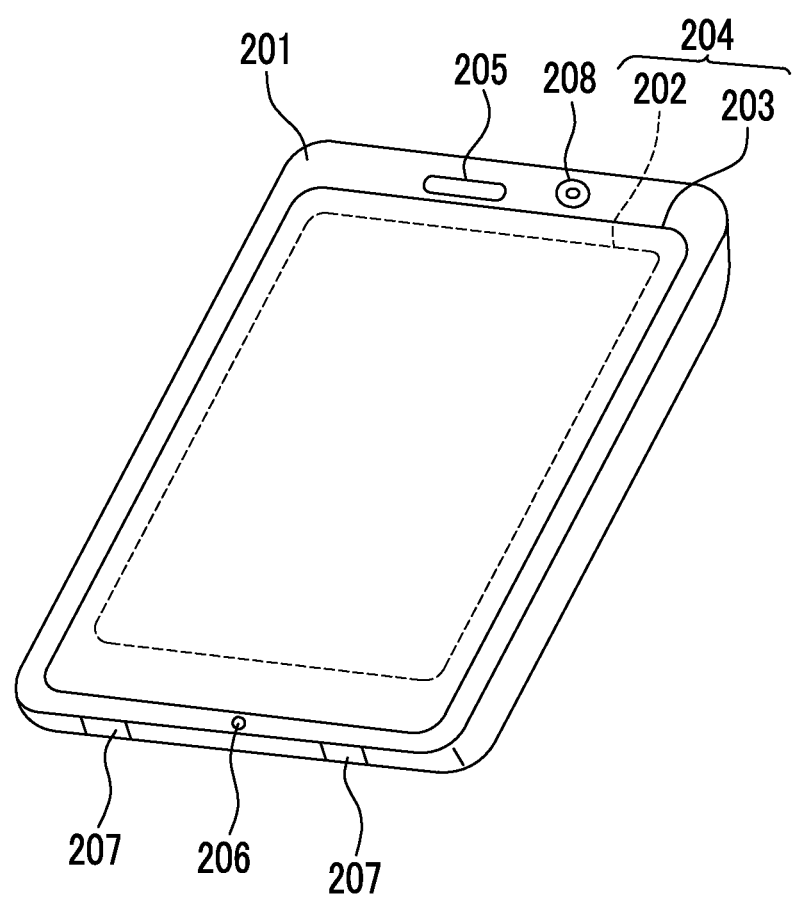
FIG. 15 shows an appearance of a smartphone 200 which is an embodiment of the imaging apparatus of the present invention.

FIG. 15 shows an appearance of a smartphone 200 which is an embodiment of the imaging apparatus of the present invention.

The smartphone 200 shown in FIG. 15 comprises: a housing 201 that has a flat plate shape; a display panel 202 as a display surface on one side of the housing 201; and a display input section 204 into which a manipulation panel 203 as an input section is integrated.

Further, the housing 201 comprises a speaker 205, a microphone 206, manipulation sections 207, and a camera section 208. Note that the configuration of the housing 201 is not limited to this. For example, it is possible to adopt a configuration in which the input section and the display surface are independent, or it is possible to adopt a configuration having a slide mechanism or a folded structure.

Figure 16:
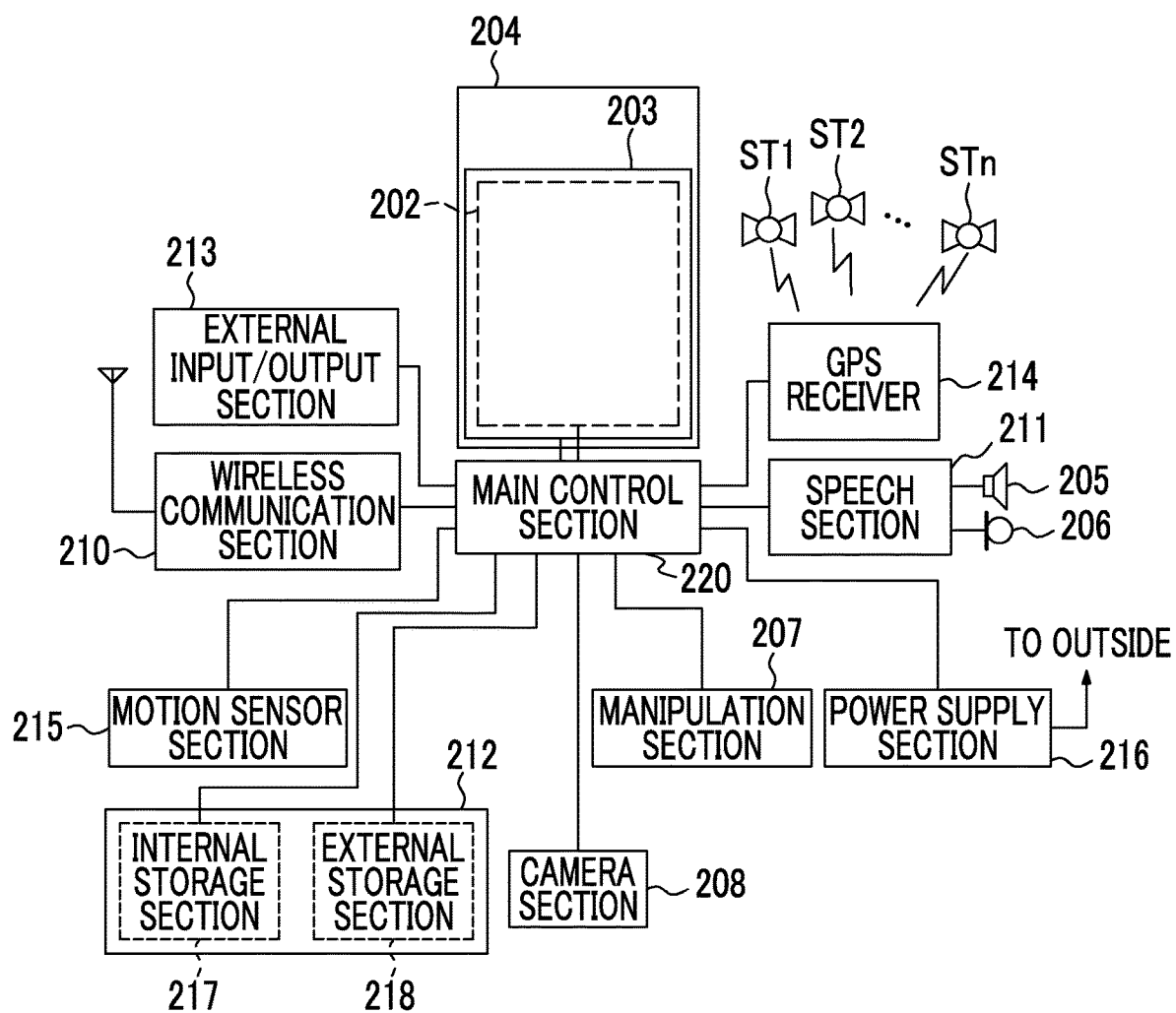
FIG. 16 is a block diagram showing a configuration of the smartphone 200 shown in FIG. 15.

FIG. 16 is a block diagram showing a configuration of the smartphone 200 shown in FIG. 15.

As shown in FIG. 16, the smartphone comprises, as main components, a wireless communication section 210, a display input section 204, a speech section 211, the manipulation sections 207, the camera section 208, a storage section 212, an external input/output section 213, a global positioning system (GPS) receiver 214, a motion sensor section 215, a power supply section 216, and a main control section 220.

As the main function of the smartphone 200, there is provided a wireless communication function of performing mobile wireless communication with a base station apparatus BS, which is not shown, through a mobile communication network NW which is not shown.

The wireless communication section 210 performs wireless communication with the base station device BS, which is included in the mobile communication network NW, in accordance with an instruction of the main control section 220. The wireless communication is used to transmit and receive various types of file data such as audio data and image data, and e-mail data or to receive web data, streaming data, or the like.

The display input section 204 is a so-called touch panel, and comprises the display panel 202 and the manipulation panel 203. The touch panel displays image (a still image and a moving image) information, text information, or the like so as to visually transport the information to a user in accordance with control of the main control section 220, and detects a user manipulation on the displayed information.

The display panel 202 uses a liquid crystal display (LCD), an organic electroluminescence display (OELD), or the like as a display device.

The manipulation panel 203 is a device that is mounted for viewing an image which is displayed on a display screen of the display panel 202 and that detects a single coordinate or a plurality of coordinates at which a manipulation is performed by a user's finger or a stylus. In a case where such a device is manipulated by a user's finger or a stylus, the device outputs a detection signal, which is generated due to the manipulation, to the main control section 220. Subsequently, the main control section 220 detects a manipulation position (coordinates) on the display panel 202, on the basis of the received detection signal.

As shown in FIG. 16, the display panel 202 and the manipulation panel 203 of the smartphone 200, which is exemplified as the imaging apparatus according to the above described embodiment of the present invention, are integrated to constitute the display input section 204, and are disposed such that the manipulation panel 203 completely covers the display panel 202.

In a case where such a disposition is adopted, the manipulation panel 203 may have a function of also detecting a user manipulation in a region other than the display panel 202. In other words, the manipulation panel 203 may comprise a detection region (hereinafter referred to as a display region) for a portion which overlaps the display panel 202 and a detection region (hereinafter referred to as a non-display region) for the other portion at the outer edge which does not overlap the display panel 202.

Note that a size of the display region and a size of the display panel 202 may completely coincide with each other, but it is not always necessary for both to coincide with each other. In addition, the manipulation panel 203 may comprise two sensing regions of the outer edge portion and the other inside portion. Furthermore, a width of the outer edge portion is properly designed depending on a size of the housing 201 and the like.

In addition, examples of the position detection method adopted for the manipulation panel 203 can include a matrix switch method, a resistance film method, a surface elastic wave method, an infrared method, an electromagnetic induction method, an electrostatic capacitance method, and the like, and any method can be adopted.

The speech section 211 comprises a speaker 205 or a microphone 206. The speech section 211 converts a sound of a user, which is input through the microphone 206, to sound data, which can be processed in the main control section 220, and outputs the data to the main control section 220, or decodes sound data, which is received by the wireless communication section 210 or the external input/output section 213, and outputs the data from the speaker 205.

In addition, as shown in FIG. 15, for example, the speaker 205 can be mounted on the same surface as the surface on which the display input section 204 is provided. Further, the microphone 206 can be mounted on a side surface of the housing 201.

The manipulation section 207 is a hardware key using a key switch or the like, and receives an instruction from a user. For example, as shown in FIG. 15, the manipulation sections 207 are button type switches which are mounted on the side surface of the housing 201 of the smartphone 200. Each switch is turned on in a case where it is pressed by a finger or the like, and is turned off due to restoring force of a spring when the finger is released.

The storage section 212 stores a control program and control data of the main control section 220, application software, address data in which names, phone numbers, or the like of communication partners are associated, received and transmitted e-mail data, web data which is downloaded by web browsing, or downloaded contents data, and temporarily stores streaming data and the like. In addition, the storage section 212 is constituted of an internal storage section 217, which is built into the smartphone, and an external storage section 218 which has a slot for an attachable and detachable external memory.

In addition, each of the internal storage section 217 and the external storage section 218 constituting the storage section 212 is realized by using a storage medium such as a flash memory type, a hard disk type, a multimedia card micro type, a card type memory (such as a MicroSD (registered trademark) memory), a random access memory (RAM), or a read only memory (ROM).

The external input/output section 213 has a function of an interface with all external devices connected to the smartphone 200. The external input/output section 213 is for communication (such as universal serial bus (USB) or IEEE1394) with other external devices, direct or indirect connection to networks (such as the Internet, wireless LAN, Bluetooth (registered trademark), radio frequency identification (RFID), infrared communication (Infrared Data Association: IrDA) (registered trademark), ultra wideband (UWB) (registered trademark), and ZigBee (registered trademark)), or the like.

Examples of the external devices connected to the smartphone 200 include a wired/wireless headset, a wired/wireless external electric charger, a wired/wireless data port, a memory card which is connected through a card socket, a subscriber identity module (SIM) or user identity module (UIM) card, external audio/video devices which are connected through audio/video input/output (I/O) terminals, external audio/video devices which are connected in a wireless manner, a smartphone which is connected in a wired or wireless manner, a personal computer which is connected in a wired or wireless manner, an earphone which is connected in a wired or wireless manner, and the like.

The external input/output section 213 can transport the data, which is transmitted from such external devices, to the components within the smartphone 200, and to transmit the data within the smartphone 200 to the external devices.

The GPS receiver 214 receives a plurality of GPS signals, which are transmitted from GPS satellites ST1 to STn, in accordance with instructions of the main control section 220, executes positioning calculation processing on the basis of the received GPS signals, and detects a position formed of a latitude, a longitude, and an altitude of the smartphone 200. The GPS receiver 214 can detect the position by using position information when it is possible to acquire the position information from the wireless communication section 210 or the external input/output section 213 (for example, wireless LAN).

The motion sensor section 215 comprises, for example, a triaxial acceleration sensor, and detects physical movement of the smartphone 200, in accordance with an instruction of the main control section 220. By detecting physical movement of the smartphone 200, an acceleration or a direction of the movement of the smartphone 200 is detected. Such a detection result is output to the main control section 220.

The power supply section 216 supplies the respective sections of the smartphone 200 with electric power, which is stored in a battery (not shown), in accordance with an instruction of the main control section 220.

The main control section 220 comprises a microprocessor, and collectively controls the respective sections of the smartphone 200 by performing an operation on the basis of control data and a control program stored in the storage section 212. In addition, the main control section 220 has an application processing function and a mobile communication control function of controlling the respective sections of a communication system in order to perform data communication or sound communication through the wireless communication section 210.

The application processing function is realized by an operation of the main control section 220 using application software stored in the storage section 212. Examples of the application processing function include: an infrared communication function of performing data communication with other devices by controlling the external input/output section 213; an e-mail function of transmitting and receiving e-mails; a web browsing function of browsing web pages; and the like.

Further, the main control section 220 has an image processing function of displaying a video on the display input section 204 and the like, on the basis of image data (the still image and the moving image data) such as received data or downloaded streaming data.

The image processing function means a function of causing the main control section 220 to decode the image data, apply image processing to the decoding result, and display an image on the display input section 204.

Furthermore, the main control section 220 executes a display control for the display panel 202 and manipulation detection control to detect the user manipulation through the manipulation sections 207 and the manipulation panel 203.

Through execution of the display control, the main control section 220 displays an icon for activating application software or a window for displaying a software key such as a scroll bar or creating an e-mail.

In addition, the scroll bar means a software key for receiving an instruction to move a display portion of an image on a large image which cannot be entirely shown in the display region of the display panel 202.

In addition, through execution of the manipulation detection control, the main control section 220 detects the user manipulation performed through the manipulation section 207, receives a manipulation performed on the icon and a text input performed in an input field of the window through the manipulation panel 203, or receives a request to scroll a displayed image through the scroll bar.

Furthermore, the main control section 220 has a touch panel control function performed through execution of the manipulation detection control, the function being a function of determining whether the manipulation position of the manipulation panel 203 is in the overlapping portion (the display region) which overlaps with the display panel 202 or the other portion (the non-display region) at the outer edge which does not overlap with the display panel 202, and controlling the display position of the software key or the sensing region of the manipulation panel 203.

In addition, the main control section 220 can detect a gesture manipulation performed on the manipulation panel 203, and can execute a predetermined function according to the detected gesture manipulation.

The gesture manipulation means a manipulation for drawing a locus with a finger or the like, a manipulation of specifying a plurality of positions simultaneously, or a manipulation of drawing loci from a plurality of positions to at least one position as a combination of the above described manipulations, rather than a simple touch manipulation in the related art.

The camera section 208 includes the constituent elements other than the external memory control section 20, the storage medium 21, the display device controller 22, the display surface 23, and the manipulation section 14 in the digital camera 100 or the modification example thereof shown in FIG. 1. In addition, the display controller 11B included in the camera section 208 performs control to display the live view image on the display panel 202.

The picked up image data, which is generated by the camera section 208, can be stored in the storage section 212, or can be output through the external input/output section 213 or the wireless communication section 210.

In the smartphone 200 shown in FIG. 15, the camera section 208 is mounted on the same side as the display input section 204. However, the mounting position of the camera section 208 is not limited to this. The camera section 208 may be mounted on a rear side of the housing 201.

Further, the camera section 208 can be used in various functions of the smartphone 200. For example, the image acquired by the camera section 208 can be displayed on the display panel 202, or the image of the camera section 208 can be used as one of the manipulation inputs of the manipulation panel 203.

Further, in a case where the GPS receiver 214 detects a position, the GPS receiver 214 can also detect the position with reference to an image obtained from the camera section 208. Furthermore, it is also possible to determine a direction of an optical axis of the camera section 208 of the smartphone 200 or determine a current usage environment, using the GPS receiver 214 in a combination with the triaxial acceleration sensor or without using the triaxial acceleration sensor, with reference to the image obtained from the camera section 208. Needless to say, the image obtained from the camera section 208 can also be used in the application software.

Otherwise, the position information acquired by the GPS receiver 214, the sound information acquired by the microphone 206 (or text information obtained through sound text conversion performed by the main control section or the like), posture information acquired by the motion sensor section 215, and the like can be added to the image data of the still image or the moving image, and the image data can be stored in the storage section 212, or can be output through the external input/output section 213 or the wireless communication section 210.

Also in the smartphone 200 configured as described above, the risk of losing sight of the subject can be reduced.

As described above, the following is described in this specification.

(1) An imaging apparatus comprising:
an imager
that has a plurality of pixels each including a photoelectric conversion element, and a charge holder holding a charge transferred from the photoelectric conversion element such that a signal corresponding to the charge is read out by a readout circuit,
that comprises a plurality of pixel rows including the plurality of pixels arranged in one direction, and
that discharges charges of the photoelectric conversion element and the charge holder to a charge discharge region of the readout circuit such that a reset of each of the photoelectric conversion element and the charge holder is performed; and
an imaging controller that performs
a global reset drive of simultaneously resetting the photoelectric conversion element of each of the plurality of pixels to start exposure of the plurality of pixels,
a global shutter drive of simultaneously transferring, to the charge holder, the charges accumulated in the photoelectric conversion element of each of the plurality of pixels by the exposure to end the exposure,
a first rolling readout drive of sequentially reading out, for each of the pixel rows, the signal corresponding to the charge held in the charge holder by the global shutter drive,
a rolling shutter drive of sequentially performing processing of transferring, to the charge holder, the charge accumulated in the photoelectric conversion element of the pixel row for which the exposure has been started to end the exposure of the pixel row, while changing the pixel rows, and
a second rolling readout drive of sequentially reading out the signal corresponding to the charge held in the charge holder of the pixel row by the rolling shutter drive, while changing the pixel rows,
wherein the imaging controller performs a first imaging control in which after the global reset drive, the global shutter drive, and the first rolling readout drive are sequentially performed, the rolling shutter drive is performed to sequentially end, for each of the pixel rows, the exposure of the pixel started by the global shutter drive, and the second rolling readout drive is performed to read out the signal corresponding to the charge held in the charge holder of the pixel row for which the exposure has been ended.

(2) The imaging apparatus described in (1), wherein the imaging controller selectively performs any of the first imaging control, and a second imaging control in which after the global reset drive, the global shutter drive, and the first rolling readout drive are sequentially performed, a rolling reset drive is sequentially performed for processing of discharging the charge of the photoelectric conversion element of the pixel row to the charge discharge region to start the exposure of the photoelectric conversion element, while changing the pixel rows, and after a start of the rolling reset drive, the rolling shutter drive is started to sequentially end the exposure, and the second rolling readout drive is performed to read out the signal corresponding to the charge held in the charge holder of the pixel row for which the exposure has been ended.

(3) The imaging apparatus described in (2), wherein the plurality of pixels includes phase difference detection pixels, the imaging apparatus further comprising:
a focus controller that performs a focus control of an imaging optical system including a stop and a focus lens disposed in front of the imager, based on a signal output from the phase difference detection pixel by the second rolling readout drive, wherein in a case where an F-Number of the stop at the time of the global reset drive is equal to or less than a predetermined stop threshold value, the imaging controller performs the first imaging control, and in a case where the F-Number exceeds the stop threshold value, the imaging controller performs the second imaging control in a state in which the F-Number of the stop is controlled to be equal to or less than the stop threshold value after the global shutter drive.

(4) The imaging apparatus described in (2), wherein based on a time between a start timing of the global shutter drive in a case of performing the first imaging control and a start timing of the rolling shutter drive, and an F-Number of a stop included in an imaging optical system disposed in front of the imager set at the time of the global reset drive, the imaging controller calculates an exposure value of the imager at the time of the exposure started by the global shutter drive in the case of performing the first imaging control, and based on the calculated exposure value, the imaging controller selects and executes any of the first imaging control and the second imaging control.

(5) The imaging apparatus (4), wherein in a case where the exposure value is less than a predetermined first exposure threshold value, the imaging controller performs the first imaging control, and in a case where the exposure value is equal to or more than the first exposure threshold value, the imaging controller performs the second imaging control.

(6) The imaging apparatus described in (4), wherein the plurality of pixels includes phase difference detection pixels,
the imaging apparatus further comprising:
a focus controller that performs a focus control of a focus lens included in the imaging optical system, based on a signal output from the phase difference detection pixel by the second rolling readout drive; and
a display controller that displays, on a display device, a live view image generated based on a signal output from the pixel of the imager by the second rolling readout drive,
wherein in a case where the exposure value is equal to or more than the first exposure threshold value, the imaging controller performs the second imaging control, and in a case where the exposure value is less than the first exposure threshold value, the imaging controller performs the first imaging control, and
wherein in a case where the exposure value is less than the first exposure threshold value and is equal to or more than a second exposure threshold value smaller than the first exposure threshold value, the display controller stops a display of the live view image on the display device based on a signal output from the imager by the second rolling readout drive in the first imaging control.

(7) The imaging apparatus described in (1), wherein the plurality of pixels includes phase difference detection pixels,
the imaging apparatus further comprising:
a focus controller that performs a focus control of an imaging optical system including a stop and a focus lens disposed in front of the imager, based on a signal output from the phase difference detection pixel by the second rolling readout drive; and
a display controller that displays, on a display device, a live view image generated based on a signal output from the pixel of the imager by the second rolling readout drive,
wherein based on a time between a start timing of the global shutter drive in a case of performing the first imaging control and a start timing of the rolling shutter drive, and an F-Number of the stop at the time of the global reset drive, the imaging controller calculates an exposure value of the imager at the time of the exposure started by the global shutter drive in the case of performing the first imaging control, and wherein in a case where the exposure value is less than a predetermined first exposure threshold value and is equal to or more than a second exposure threshold value smaller than the first exposure threshold value, the display controller stops a display of the live view image on the display device based on a signal output from the imager by the second rolling readout drive in the first imaging control.

(8) An imaging method using an imager
that has a plurality of pixels each including a photoelectric conversion element, and a charge holder holding a charge transferred from the photoelectric conversion element such that a signal corresponding to the charge is read out by a readout circuit,
that comprises a plurality of pixel rows including the plurality of pixels arranged in one direction, and
that discharges charges of the photoelectric conversion element and the charge holder to a charge discharge region of the readout circuit such that a reset of each of the photoelectric conversion element and the charge holder is performed, the imaging method comprising:
an imaging control step of performing
a global reset drive of simultaneously resetting the photoelectric conversion element of each of the plurality of pixels to start exposure of the plurality of pixels,
a global shutter drive of simultaneously transferring, to the charge holder, the charges accumulated in the photoelectric conversion element of each of the plurality of pixels by the exposure to end the exposure,
a first rolling readout drive of sequentially reading out, for each of the pixel rows, the signal corresponding to the charge held in the charge holder by the global shutter drive,
a rolling shutter drive of sequentially performing processing of transferring, to the charge holder, the charge accumulated in the photoelectric conversion element of the pixel row for which the exposure has been started to end the exposure of the pixel row, while changing the pixel rows, and
a second rolling readout drive of sequentially reading out the signal corresponding to the charge held in the charge holder of the pixel row by the rolling shutter drive, while changing the pixel rows,
wherein in the imaging control step, a first imaging control is performed, in which after the global reset drive, the global shutter drive, and the first rolling readout drive are sequentially performed, the rolling shutter drive is performed to sequentially end, for each of the pixel rows, the exposure of the pixel started by the global shutter drive, and the second rolling readout drive is performed to read out the signal corresponding to the charge held in the charge holder of the pixel row for which the exposure has been ended.

(9) The imaging method described in (8), wherein in the imaging control step, any of the first imaging control and a second imaging control is selectively performed, and in the second imaging control, after the global reset drive, the global shutter drive, and the first rolling readout drive are sequentially performed, a rolling reset drive is sequentially performed for processing of discharging the charge of the photoelectric conversion element of the pixel row to the charge discharge region to start the exposure of the photoelectric conversion element, while changing the pixel rows, and after a start of the rolling reset drive, the rolling shutter drive is started to sequentially end the exposure, and then the second rolling readout drive is performed to read out the signal corresponding to the charge held in the charge holder of the pixel row for which the exposure has been ended.

(10) The imaging method described in (9), wherein the plurality of pixels includes phase difference detection pixels, the imaging method, further comprising:

a focus control step of performing a focus control of an imaging optical system including a stop and a focus lens disposed in front of the imager, based on a signal output from the phase difference detection pixel by the second rolling readout drive, wherein in the imaging control step, in a case where an F-Number of the stop at the time of the global reset drive is equal to or less than a predetermined stop threshold value, the first imaging control is performed, and in a case where the F-Number exceeds the stop threshold value, the second imaging control is performed in a state in which the F-Number of the stop is controlled to be equal to or less than the stop threshold value after the global shutter drive.

(11) The imaging method described in (9), wherein in the imaging control step, based on a time between a start timing of the global shutter drive in a case of performing the first imaging control and a start timing of the rolling shutter drive, and an F-Number of a stop included in an imaging optical system disposed in front of the imager set at the time of the global reset drive, an exposure value of the imager at the time of the exposure started by the global shutter drive in the case of performing the first imaging control is calculated, and based on the calculated exposure value, any of the first imaging control and the second imaging control is selected and executed.

(12) The imaging method described in (11), wherein in the imaging control step, in a case where the exposure value is less than a predetermined first exposure threshold value, the first imaging control is performed, and in a case where the exposure value is equal to or more than the first exposure threshold value, the second imaging control is performed.

(13) The imaging method described in (11), wherein the plurality of pixels includes phase difference detection pixels, the imaging method, further comprising:

a focus control step of performing a focus control of a focus lens included in the imaging optical system, based on a signal output from the phase difference detection pixel by the second rolling readout drive; and a display control step of displaying, on a display device, a live view image generated based on a signal output from the pixel of the imager by the second rolling readout drive, wherein in the imaging control step, in a case where the exposure value is equal to or more than the first exposure threshold value, the second imaging control is performed, and in a case where the exposure value is less than the first exposure threshold value, the first imaging control is performed, and wherein in the display control step, in a case where the exposure value is less than the first exposure threshold value and is equal to or more than a second exposure threshold value smaller than the first exposure threshold value, a display of the live view image on the display device based on a signal output from the imager by the second rolling readout drive in the first imaging control is stopped.

(14) The imaging method described in (8), wherein the plurality of pixels includes phase difference detection pixels, the imaging method, further comprising:

a focus control step of performing a focus control of an imaging optical system including a stop and a focus lens disposed in front of the imager, based on a signal output from the phase difference detection pixel by the second rolling readout drive, a display control step of displaying, on a display device, a live view image generated based on a signal output from the pixel of the imager by the second rolling readout drive, wherein in the imaging control step, based on a time between a start timing of the global shutter drive in a case of performing the first imaging control and a start timing of the rolling shutter drive, and an F-Number of the stop at the time of the global reset drive, an exposure value of the imager at the time of the exposure started by the global shutter drive in the case of performing the first imaging control is calculated, and wherein in the display control step, in a case where the exposure value is less than a predetermined first exposure threshold value and is equal to or more than a second exposure threshold value smaller than the first exposure threshold value, a display of the live view image on the display device based on a signal output from the imager by the second rolling readout drive in the first imaging control is stopped.

(15) An imaging program causing a computer to execute an imaging method using an imager that has a plurality of pixels each including a photoelectric conversion element, and a charge holder holding a charge transferred from the photoelectric conversion element such that a signal corresponding to the charge is read out by a readout circuit, that comprises a plurality of pixel rows including the plurality of pixels arranged in one direction, and that discharges charges of the photoelectric conversion element and the charge holder to a charge discharge region of the readout circuit such that a reset of each of the photoelectric conversion element and the charge holder is performed, the imaging method comprising:

an imaging control step of performing a global reset drive of simultaneously resetting the photoelectric conversion element of each of the plurality of pixels to start exposure of the plurality of pixels, a global shutter drive of simultaneously transferring, to the charge holder, the charges accumulated in the photoelectric conversion element of each of the plurality of pixels by the exposure to end the exposure, a first rolling readout drive of sequentially reading out, for each of the pixel rows, the signal corresponding to the charge held in the charge holder by the global shutter drive, a rolling shutter drive of sequentially performing processing of transferring, to the charge holder, the charge accumulated in the photoelectric conversion element of the pixel row for which the exposure has been started to end the exposure of the pixel row, while changing the pixel rows, and a second rolling readout drive of sequentially reading out the signal corresponding to the charge held in the charge holder of the pixel row by the rolling shutter drive, while changing the pixel rows, wherein in the imaging control step, a first imaging control is performed, in which after the global reset drive, the global shutter drive, and the first rolling readout drive are sequentially performed, the rolling shutter drive is performed to sequentially end, for each of the pixel rows, the exposure of the pixel started by the global shutter drive, and the second rolling readout drive is performed to read out the signal corresponding to the charge held in the charge holder of the pixel row for which the exposure has been ended.

According to the present invention, it is possible to speed up the update of the display of the live view image after the imaging for the storage is performed and to reduce the risk of losing sight of the subject.

Although the present invention has been described with reference to the specific embodiment, the present invention is not limited to this embodiment, and various modifications are possible without departing from the technical concept of the described invention.

This application is on the basis of Japanese patent application (Japanese Patent Application No. 2017-059678) filed on Mar. 24, 2017, the content of which is incorporated herein.

EXPLANATION OF REFERENCES

100: digital camera
1: imaging lens
2: stop
4: lens control section
5: imager
60: imaging surface
61: pixel
61A: photoelectric conversion element
61B: charge holder
61C: charge transfer section
61D: floating diffusion
61E: readout circuit
62: pixel row
63: drive circuit
64: signal processing circuit
65: signal line
70: N-type substrate
71: P-well layer
72: readout circuit
73: N-type impurity layer
74: P-type impurity layer
75: region
76: transfer electrode
77: reset transistor
78: output transistor
79: selection transistor
8: lens drive section
9: stop drive section
10: imager drive section
11: system control section
11A: imaging controller
11B: display controller
11C: focus controller
14: manipulation section
15: memory control section
16: main memory
17: digital signal processing section
20: external memory control section
21: storage medium
22: display device controller
23: display surface
23A: display pixel
23B: display pixel row
24: control bus
25: data bus
40: lens device
GS, GR, RS, RR, RO1, RO2, ST, DR: straight line
200: smartphone
201: housing
202: display panel
203: manipulation panel
204: display input section
205: speaker
206: microphone
207: manipulation section
208: camera section
210: wireless communication section
211: speech section
212: storage section
213: external input/output section
214: GPS receiver
215: motion sensor section
216: power supply section
217: internal storage section
218: external storage section
220: main control section
ST1 to STn: GPS satellite

What is claimed is:

1. An imaging apparatus comprising:
an imager
that has a plurality of pixels each including a photoelectric conversion element, and a charge holder holding a charge transferred from the photoelectric conversion element such that a signal corresponding to the charge is read out by a readout circuit,
that comprises a plurality of pixel rows including the plurality of pixels arranged in one direction, and
that discharges charges of the photoelectric conversion element and the charge holder to a charge discharge region of the readout circuit such that a reset of each of the photoelectric conversion element and the charge holder is performed; and
an imaging controller that performs
a global reset drive of simultaneously resetting the photoelectric conversion element of each of the plurality of pixels to start exposure of the plurality of pixels,
a global shutter drive of simultaneously transferring, to the charge holder, the charges accumulated in the photoelectric conversion element of each of the plurality of pixels by the exposure to end the exposure,
a first rolling readout drive of sequentially reading out, for each of the pixel rows, the signal corresponding to the charge held in the charge holder by the global shutter drive,
a rolling shutter drive of sequentially performing, while changing the pixel rows, processing of transferring, to the charge holder, the charge accumulated in the photoelectric conversion element of the pixel row for which the exposure has been started to end the exposure of the pixel row, and
a second rolling readout drive of sequentially reading out, while changing the pixel rows, the signal corresponding to the charge held in the charge holder of the pixel row by the rolling shutter drive,
wherein the imaging controller performs a first imaging control in which after the global reset drive, the global shutter drive, and the first rolling readout drive are sequentially performed, the rolling shutter drive is performed to sequentially end, for each of the pixel rows, the exposure of the pixels started by the global shutter drive, and the second rolling readout drive is performed to read out the signal corresponding to the charge held in the charge holder of the pixel row for which the exposure has been ended.

2. The imaging apparatus according to claim 1,
wherein the imaging controller selectively performs any of the first imaging control, and a second imaging control in which after the global reset drive, the global shutter drive, and the first rolling readout drive are sequentially performed, a rolling reset drive is sequentially performed for processing of discharging the charge of the photoelectric conversion element of the pixel row to the charge discharge region to start the exposure of the photoelectric conversion element, while changing the pixel rows, and after a start of the rolling reset drive, the rolling shutter drive is started to sequentially end the exposure, and the second rolling readout drive is performed to read out the signal corresponding to the charge held in the charge holder of the pixel row for which the exposure has been ended.

3. The imaging apparatus according to claim 2,
wherein the plurality of pixels includes phase difference detection pixels,
the imaging apparatus further comprising:
a focus controller that performs a focus control of an imaging optical system including a stop and a focus lens disposed in front of the imager, based on a signal output from the phase difference detection pixel by the second rolling readout drive,
wherein in a case where an F-Number of the stop at the time of the global reset drive is equal to or less than a predetermined stop threshold value, the imaging controller performs the first imaging control, and in a case where the F-Number exceeds the stop threshold value, the imaging controller performs the second imaging control in a state in which the F-Number of the stop is controlled to be equal to or less than the stop threshold value after the global shutter drive.

4. The imaging apparatus according to claim 2,
wherein based on a time between a start timing of the global shutter drive in a case of performing the first imaging control and a start timing of the rolling shutter drive, and an F-Number of a stop included in an imaging optical system disposed in front of the imager set at the time of the global reset drive, the imaging controller calculates an exposure value of the imager at the time of the exposure started by the global shutter drive in the case of performing the first imaging control, and based on the calculated exposure value, the imaging controller selects and executes any of the first imaging control and the second imaging control.

5. The imaging apparatus according to claim 4,
wherein in a case where the exposure value is less than a predetermined first exposure threshold value, the imaging controller performs the first imaging control, and in a case where the exposure value is equal to or more than the first exposure threshold value, the imaging controller performs the second imaging control.

6. The imaging apparatus according to claim 4,
wherein the plurality of pixels includes phase difference detection pixels,
the imaging apparatus further comprising:
a focus controller that performs a focus control of a focus lens included in the imaging optical system, based on a signal output from the phase difference detection pixel by the second rolling readout drive; and
a display controller that displays, on a display device, a live view image generated based on a signal output from the pixel of the imager by the second rolling readout drive,
wherein in a case where the exposure value is equal to or more than the first exposure threshold value, the imaging controller performs the second imaging control, and in a case where the exposure value is less than the first exposure threshold value, the imaging controller performs the first imaging control, and
wherein in a case where the exposure value is less than the first exposure threshold value and is equal to or more than a second exposure threshold value smaller than the first exposure threshold value, the display controller stops a display of the live view image on the display device based on a signal output from the imager by the second rolling readout drive in the first imaging control.

7. The imaging apparatus according to claim 1,
wherein the plurality of pixels includes phase difference detection pixels,
the imaging apparatus further comprising:
a focus controller that performs a focus control of an imaging optical system including a stop and a focus lens disposed in front of the imager, based on a signal output from the phase difference detection pixel by the second rolling readout drive; and
a display controller that displays, on a display device, a live view image generated based on a signal output from the pixel of the imager by the second rolling readout drive,
wherein based on a time between a start timing of the global shutter drive in a case of performing the first imaging control and a start timing of the rolling shutter drive, and an F-Number of the stop at the time of the global reset drive, the imaging controller calculates an exposure value of the imager at the time of the exposure started by the global shutter drive in the case of performing the first imaging control, and
wherein in a case where the exposure value is less than a predetermined first exposure threshold value and is equal to or more than a second exposure threshold value smaller than the first exposure threshold value, the display controller stops a display of the live view image on the display device based on a signal output from the imager by the second rolling readout drive in the first imaging control.

8. An imaging method with an imager
that has a plurality of pixels each including a photoelectric conversion element, and a charge holder holding a charge transferred from the photoelectric conversion element such that a signal corresponding to the charge is read out by a readout circuit,
that comprises a plurality of pixel rows including the plurality of pixels arranged in one direction, and
that discharges charges of the photoelectric conversion element and the charge holder to a charge discharge region of the readout circuit such that a reset of each of the photoelectric conversion element and the charge holder is performed, the imaging method comprising:
an imaging control step of performing
a global reset drive of simultaneously resetting the photoelectric conversion element of each of the plurality of pixels to start exposure of the plurality of pixels,
a global shutter drive of simultaneously transferring, to the charge holder, the charges accumulated in the photoelectric conversion element of each of the plurality of pixels by the exposure to end the exposure, a first rolling readout drive of sequentially reading out, for each of the pixel rows, the signal corresponding to the charge held in the charge holder by the global shutter drive, a rolling shutter drive of sequentially performing, while changing the pixel rows, processing of transferring, to the charge holder, the charge accumulated in the photoelectric conversion element of the pixel row for which the exposure has been started to end the exposure of the pixel row, and a second rolling readout drive of sequentially reading out, while changing the pixel rows, the signal corresponding to the charge held in the charge holder of the pixel row by the rolling shutter drive, wherein in the imaging control step, a first imaging control is performed, in which after the global reset drive, the global shutter drive, and the first rolling readout drive are sequentially performed, the rolling shutter drive is performed to sequentially end, for each of the pixel rows, the exposure of the pixels started by the global shutter drive, and the second rolling readout drive is performed to read out the signal corresponding to the charge held in the charge holder of the pixel row for which the exposure has been ended.

9. The imaging method according to claim 8,
wherein in the imaging control step, any of the first imaging control and a second imaging control is selectively performed, and in the second imaging control, after the global reset drive, the global shutter drive, and the first rolling readout drive are sequentially performed, a rolling reset drive is sequentially performed for processing of discharging the charge of the photoelectric conversion element of the pixel row to the charge discharge region to start the exposure of the photoelectric conversion element, while changing the pixel rows, and after a start of the rolling reset drive, the rolling shutter drive is started to sequentially end the exposure, and then the second rolling readout drive is performed to read out the signal corresponding to the charge held in the charge holder of the pixel row for which the exposure has been ended.

10. The imaging method according to claim 9,
wherein the plurality of pixels includes phase difference detection pixels,
the imaging method, further comprising:
a focus control step of performing a focus control of an imaging optical system including a stop and a focus lens disposed in front of the imager, based on a signal output from the phase difference detection pixel by the second rolling readout drive,
wherein in the imaging control step, in a case where an F-Number of the stop at the time of the global reset drive is equal to or less than a predetermined stop threshold value, the first imaging control is performed, and in a case where the F-Number exceeds the stop threshold value, the second imaging control is performed in a state in which the F-Number of the stop is controlled to be equal to or less than the stop threshold value after the global shutter drive.

11. The imaging method according to claim 9,
wherein in the imaging control step, based on a time between a start timing of the global shutter drive in a case of performing the first imaging control and a start timing of the rolling shutter drive, and an F-Number of a stop included in an imaging optical system disposed in front of the imager set at the time of the global reset drive, an exposure value of the imager at the time of the exposure started by the global shutter drive in the case of performing the first imaging control is calculated, and based on the calculated exposure value, any of the first imaging control and the second imaging control is selected and executed.

12. The imaging method according to claim 11,
wherein in the imaging control step, in a case where the exposure value is less than a predetermined first exposure threshold value, the first imaging control is performed, and in a case where the exposure value is equal to or more than the first exposure threshold value, the second imaging control is performed.

13. The imaging method according to claim 11,
wherein the plurality of pixels includes phase difference detection pixels,
the imaging method, further comprising:
a focus control step of performing a focus control of a focus lens included in the imaging optical system, based on a signal output from the phase difference detection pixel by the second rolling readout drive; and
a display control step of displaying, on a display device, a live view image generated based on a signal output from the pixel of the imager by the second rolling readout drive,
wherein in the imaging control step, in a case where the exposure value is equal to or more than the first exposure threshold value, the second imaging control is performed, and in a case where the exposure value is less than the first exposure threshold value, the first imaging control is performed, and
wherein in the display control step, in a case where the exposure value is less than the first exposure threshold value and is equal to or more than a second exposure threshold value smaller than the first exposure threshold value, a display of the live view image on the display device based on a signal output from the imager by the second rolling readout drive in the first imaging control is stopped.

14. The imaging method according to claim 8,
wherein the plurality of pixels includes phase difference detection pixels,
the imaging method, further comprising:
a focus control step of performing a focus control of an imaging optical system including a stop and a focus lens disposed in front of the imager, based on a signal output from the phase difference detection pixel by the second rolling readout drive,
a display control step of displaying, on a display device, a live view image generated based on a signal output from the pixel of the imager by the second rolling readout drive,
wherein in the imaging control step, based on a time between a start timing of the global shutter drive in a case of performing the first imaging control and a start timing of the rolling shutter drive, and an F-Number of the stop at the time of the global reset drive, an exposure value of the imager at the time of the exposure started by the global shutter drive in the case of performing the first imaging control is calculated, and
wherein in the display control step, in a case where the exposure value is less than a predetermined first exposure threshold value and is equal to or more than a second exposure threshold value smaller than the first exposure threshold value, a display of the live view image on the display device based on a signal output from the imager by the second rolling readout drive in the first imaging control is stopped.

15. A non-transitory computer readable medium storing an imaging program causing a computer to execute an imaging method using an imager
  that has a plurality of pixels each including a photoelectric conversion element, and a charge holder holding a charge transferred from the photoelectric conversion element such that a signal corresponding to the charge is read out by a readout circuit,
  that comprises a plurality of pixel rows including the plurality of pixels arranged in one direction, and
  that discharges charges of the photoelectric conversion element and the charge holder to a charge discharge region of the readout circuit such that a reset of each of the photoelectric conversion element and the charge holder is performed,
the imaging method comprising:
an imaging control step of performing
  a global reset drive of simultaneously resetting the photoelectric conversion element of each of the plurality of pixels to start exposure of the plurality of pixels,
  a global shutter drive of simultaneously transferring, to the charge holder, the charges accumulated in the photoelectric conversion element of each of the plurality of pixels by the exposure to end the exposure,
  a first rolling readout drive of sequentially reading out, for each of the pixel rows, the signal corresponding to the charge held in the charge holder by the global shutter drive,
  a rolling shutter drive of sequentially performing, while changing the pixel rows, processing of transferring, to the charge holder, the charge accumulated in the photoelectric conversion element of the pixel row for which the exposure has been started to end the exposure of the pixel row, and
  a second rolling readout drive of sequentially reading out, while changing the pixel rows, the signal corresponding to the charge held in the charge holder of the pixel row by the rolling shutter drive,
wherein in the imaging control step, a first imaging control is performed, in which after the global reset drive, the global shutter drive, and the first rolling readout drive are sequentially performed, the rolling shutter drive is performed to sequentially end, for each of the pixel rows, the exposure of the pixels started by the global shutter drive, and the second rolling readout drive is performed to read out the signal corresponding to the charge held in the charge holder of the pixel row for which the exposure has been ended.

* * * * *